United States Patent
Takaishi et al.

(10) Patent No.: US 7,564,643 B2
(45) Date of Patent: Jul. 21, 2009

(54) HEAD POSITION CONTROL DEVICE AND MEDIUM STORAGE DEVICE

(75) Inventors: Kazuhiko Takaishi, Kawasaki (JP); Takeshi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/017,157

(22) Filed: Jan. 21, 2008

(65) Prior Publication Data

US 2008/0218896 A1    Sep. 11, 2008

(30) Foreign Application Priority Data

Feb. 22, 2007 (JP) ............................. 2007-042030

(51) Int. Cl.
   G11B 5/596 (2006.01)
   G11B 21/02 (2006.01)
(52) U.S. Cl. ...................... 360/77.04; 360/75
(58) Field of Classification Search ........................ None
   See application file for complete search history.

(56) References Cited

U.S. PATENT DOCUMENTS 6,128,153 A * 10/2000 Hasegawa et al. ......... 360/77.08
6,865,051 B2    3/2005 Takaishi
6,995,944 B1    2/2006 Takaishi et al.
7,136,256 B2   11/2006 Takaishi et al.
2003/0235002 A1  12/2003 Takaishi

FOREIGN PATENT DOCUMENTS

| EP | 0 774 754 A2 | 5/1997 |
| EP | 1 727 133 A2 | 11/2006 |
| JP | A 2004-22133 | 1/2004 |
| JP | A 2005-32337 | 2/2005 |
| JP | A 2006-179185 | 7/2006 |

* cited by examiner

*Primary Examiner*—K. Wong
(74) *Attorney, Agent, or Firm*—Greer, Burns & Crain, Ltd.

(57) ABSTRACT

A head position control device uses a current observer control which performs two degree of freedom control, with which a current step difference due to the difference of eccentricities between heads is prevented without affecting the seek waveform after switching heads. The head position control device has a locus generation section, which calculates an initial value of the correction locus for canceling the current step difference of the output current based on an output current supplied to an actuator before switching, and an eccentricity correction current and initial velocity of another head after switching; and a two degree of freedom control system to which a seek locus is input, and supplies a correction locus according to the initial value to the two degree of freedom control system. One parameter can correct the initial velocity and the current step difference.

20 Claims, 23 Drawing Sheets

PRIOR ART

HEAD POSITION CONTROL DEVICE AND MEDIUM STORAGE DEVICE

CROSS-REFERENCE TO RELATED APPLICATIONS

This application is based upon and claims the benefit of priority from the prior Japanese Patent Application No. 2007-42030, filed on Feb. 22, 2007, the entire contents of which are incorporated herein by reference.

BACKGROUND OF THE INVENTION

1. Field of the Invention

The present invention relates to a head position control device and medium storage device which controls an eccentricity of a head according to an eccentricity of a disk, and more particularly to a head position control device and a medium storage device for preventing a step difference of drive current which is generated when one head is switched to another head.

2. Description of the Related Art

In medium storage device, such as a magnetic disk device and optical disk device, a plurality of heads are positioned by a same actuator so as to face different disk surfaces. For example, a head is positioned onto a target track by performing seek control, which moves the head to a target track of a facing disk, and performing following control, which is performed thereafter.

As FIG. 24 shows, in this disk device, eccentricity of a disk exists. For example, a locus 110 of a servo signal on one disk surface facing a head A and a locus 112 of a servo signal on another disk surface facing a head B are eccentric with respect to the rotation center of a spindle motor which rotates the disk.

A position is detected by reading a servo signal, and by controlling eccentricity based on the position so as to follow up the servo signal, a position of a head is controlled along the servo signal of a disk which the head is facing, therefore such eccentricity does not become a problem between one head and a disk that the head is facing.

On the other hand, as FIG. 24 shows, loci 110 and 112 of servo signals on two disk surfaces with respect to the rotation center of the motor of the disk device may be different from each other, that is, the eccentricity of a head A and the eccentricity of a head B may be different in some cases. In the case of a system of performing the recording of servo signals to an individual disk before assembling the device, and assembling the disk in the device (called media STW: Servo Track Write), an eccentricity is generated and the difference of eccentricity between disks is large. Also in the case of using a magnetic transfer disk which records servo signals on a disk by magnetic transfer, or using a patterned media where a magnetic recording layer is formed only on the recording tracks of the disk substrate, eccentricity differs between the front and back of the disk.

Because of the difference in eccentricity among disk surfaces, following up the eccentricity of a switched head is required when a head is switched. In other words, if a head A, which is following up the locus 110 of a servo signal, is switched to a head B, the head B must follow up the locus 112 of the servo signal.

FIG. 26 shows an example when the eccentricity locus is different between head A and head B, and shows the changes of current, velocity and position when the head A, which is being position-controlled on a track (locus 110 in FIG. 24), is switched to a head B on a different disk surface. To simplify description, in FIG. 26, it is assumed that the eccentricity of the disk surface of the head A is "0", and only the disk surface of the head B is eccentric, and the drive current, velocity and position of the head B are shown.

As FIG. 26 shows, the eccentricity correction current of the head B is shown by a sine wave, of which frequency is the same as the rotation frequency. As FIG. 26 shows, immediately after the head A is switched to the head B, the eccentricity correction current is switched from the eccentricity correction of the disk surface of the head A to the eccentricity correction of the disk surface of the head B. By this, a step difference of which value is u0 is generated in a relative current U. The head B has an initial velocity of relative velocity V0 because of the difference of the sine wave loci of the head A and head B. The relative position also changes X0.

However, it has been assumed that the initial velocity when the heads are switched is "0" or the same velocity as the previous head. In head switching, normally the seek control of the new head is performed after switching. Since the initial velocity when the seek control starts is not "0", oscillation occurs when the head reaches the target position, and it takes time to converge the oscillation, which causes a delay in the seek time.

If current is sharply switched when the heads are switched and the step difference u0 of the eccentricity correction current is large, the actuator resonates and oscillation is generated. Therefore if a sharp step difference is generated in the initial current u0, as shown in FIG. 26, oscillation is generated, and seek time delays.

As a method for lessening the current step difference when the heads are switched, a control system, to which an initial current and current step difference cancellation function are added, shown in FIG. 25, has been proposed (e.g. see Japanese Patent Application Laid-Open No. 2004-022133 (FIG. 5 to FIG. 7)).

As FIG. 25 shows, the servo control system having the eccentricity correction function has: a computing unit 140 which calculates a position error (r−y) between a target position "r" and a current position "y", a controller C which calculates current to eliminate the position error and outputs it to an actuator P that is a plant, a table 144 which stores an eccentricity correction current for each head so as to follow up an eccentricity of a disk; and an adder 142 which adds an eccentricity correction current corresponding to a selected head (disk surface) Head in the table 144, to a command current from the controller C, and supplies the result to the plant P.

A correction locus generation section 160 determines an initial velocity and current step difference when heads are switched, from the head HeadOld before switching and the head Head after switching, and generates a correction position locus and correction current. The adder 162 adds the current correction locus to the eccentricity correction current from the eccentricity correction table 144 determined from the head Head after switching, so as to cancel the step difference generated by the switching. The computing unit 164 subtracts the position correction locus from the current position "y", and outputs the result to the computing unit 140.

In other words, the correction locus generation section 160 provides a locus to make the initial velocity zero to the controller C from the outside. The correction locus generation circuit 160 also calculates a locus, including current to cancel the current step difference for the amount of the initial current u0, and corrects the eccentricity correction current.

This conventional proposal is effective when seek control is not performed for the switched head immediately after switching heads. However, if seek control is immediately performed for the switched head, the relationship with seek current values must be considered. In other words, during seeking, the saturation of current and the high frequency components to be added must be considered.

In order to correct velocity so that the velocity is suppressed and resonance is not generated, a current waveform, which is still smooth even after being combined with the seek current, must be added. But in the prior art, as compensation currents in proportion to the initial velocity and current step difference is individually added to the seek current, the waveform of the combined current is changed to vary depending on the velocity and the value of the step difference current. Therefore if these compensation currents are added to the ordinary seek current waveform shown in FIG. 27, the initial current value in seeking suddenly increases, as shown in FIG. 28, or the initial current value in seeking suddenly decreases, as shown in FIG. 29. So, current waveform in initial time of seeking is distorted.

These distortions easily generate noise if there are many high frequency components. For example, if a current with many high frequency components, such as several kHz, is supplied, an user perceives noisy.

In order to decrease the noise, it is necessary to make the waveform shape uniform, and not to include high frequency components. The seek waveform, however, changes depending on the seek time (distance), so according to the prior art, a smooth current waveform is simulated offline individually for the initial velocity and for the current step difference correction so that velocity is suppressed and resonance is not generated, and a number of waveforms corresponding to the seek time must be prepared.

This design takes time, and storing many waveforms according to the change of seek time increases the memory capacity of the device, which impedes cost reduction.

Recently as the use of disk devices expands, disk devices are being installed in acoustic equipment, so designing for silence is demanded for devices, and minimizing operation sounds is required. For this, it is demanded to easily solve the problem of the generation of audible sounds due to the current step difference.

SUMMARY OF THE INVENTION

With the foregoing in view, it is an object of the present invention to provide a head position control device and medium storage device for preventing a generation of noise due to the current step difference, which is generated by eccentricity correction, when heads are switched.

It is another object of the present invention to provide a head position control device and medium storage device for preventing the generation of noise due to the current step difference, which is generated by eccentricity correction, even if seek control is performed immediately after switching heads.

It is still another object of the present invention to provide a head position control device and medium storage device for generating a locus for canceling the step difference corresponding to a seek waveform, even if seek control is performed immediately after switching heads.

It is still another object of the present invention to provide a head position control device and media storage device for canceling the current difference generated when heads are switched, easily estimating the saturation current during seeking, and preventing the saturation of seek current.

To achieve these objects, a medium storage device of the embodiment has: a plurality of heads for at least reading data on each surface of rotating storage media; an actuator for positioning the plurality of heads at predetermined positions of the storage media; and a control unit configured as a two degree of freedom control system, which corrects an eccentricity of the actuator by eccentricity correction current on a disk surface facing the specified head, and which executes seek control according to a position error between a target position of the head and a current position acquired from the head. And when the control unit switches one head to another head and seek the another head, the control unit acquires an output current supplied to the actuator before the switching, and the eccentricity correction current and the initial velocity of the another head after the switching, calculates an initial value of a correction locus to cancel a current step difference of the output current due to the head switching, and supplies the correction locus according to the initial value to the two degree of freedom control system where the seek locus is input.

A head position control device of the embodiment is a head position control device for controlling a position of an actuator which positions a plurality of heads for at least reading data on each surface of rotating storage media at predetermined positions of the storage media, having: an eccentricity correction current table which stores eccentricity correction current on a disk surface facing a specified head; and a control unit configured as a two degree of freedom control system which corrects an eccentricity of the actuator by the eccentricity correction current of a specified head in the eccentricity correction current table, and executes seek control according to a position error between a target position of the head and a current position acquired from the head. And when the control unit switches one head to another head, the control unit acquires an output current supplied to the actuator before the switching, and the eccentricity correction current and initial velocity of the another head after the switching, calculates an initial value of a correction locus to cancel a current step difference of the output current due to the head switching, and supplies a correction locus according to the initial value to the two degree of freedom control system, where the seek locus is input.

In the present invention, it is preferable that the control unit adds the initial value to the seek distance to be sought, generates a seek locus of the added distance, and supplies the result to the two degree of freedom current observer control.

In the present invention, it is preferable that the control unit generates a corrected position locus to be "0" from the initial value according to the time elapsed, and supplies the locus to the two degree of freedom current observer control.

In the present invention, it is preferable that the control unit adds the seek locus and the corrected position locus, and supplies the result to the two degree of freedom current observer control system.

In the present invention, it is preferable that the control unit converts the initial value into an initial current value, generates a corrected current locus to be "0" from the initial current value according to the time elapsed, and supplies the locus to the two degree of freedom current observer control.

In the present invention, it is preferable that the control unit adds the corrected current locus to the current output of the two degree of freedom current observer control system, where the seek locus is supplied.

In the present invention, it is preferable that the control unit acquires a current position of a sample after switching and a current position of a next sample from the output of the head, and calculates the current velocity.

In the present invention, it is preferable that the control unit calculates the current velocity from a difference between the output current of a sample before switching and the eccentricity correction current after switching.

In the present invention, it is preferable that the control unit corrects an estimated position of the current sample based on an estimated position error between the current position and the estimated position of the current sample of the current observer, computes a difference between the corrected estimated position and a target locus of the current sample, computes an output value of the actuator from the difference, and computes an estimated position for the next output value computation based on the corrected estimated position and the output value of the current sample.

In the present invention, it is preferable that the control unit computes an estimated position at a time advanced from the sampling point of time by a predetermined time based on an output value that is, by one sample, previous to the current sample and the difference, and computes an estimated position for the next output value computation based on the corrected estimated position, the output value of the current sample and the output value that is, by one sample, previous to the current sample.

Since the initial value of the corrected locus for canceling the current step difference of output current is calculated based on an output current supplied to the actuator before switching and an eccentricity correction current and initial velocity of another head after switching, and the corrected locus according to the initial value is supplied to the two degree of freedom control system to which a seek locus is input, the current step difference can be corrected by the initial value of a locus that cancels the current step difference according to the characteristic of the two degree of freedom control system, and one parameter can correct the initial velocity and the current step difference. Hence designing the correction waveform of the current step difference, with respect to each seek current waveform, becomes easier, and seek control without generating vibration and noise can be easily implemented.

DESCRIPTION OF THE PREFERRED EMBODIMENTS

Embodiments of the present invention are now described in the sequence of medium storage device, first embodiment of position control system, locus generation section, second embodiment, third embodiment, fourth embodiment, fifth embodiment and other embodiments, but the present invention is not limited to these embodiments.

Medium Storage Device

Figure 1:
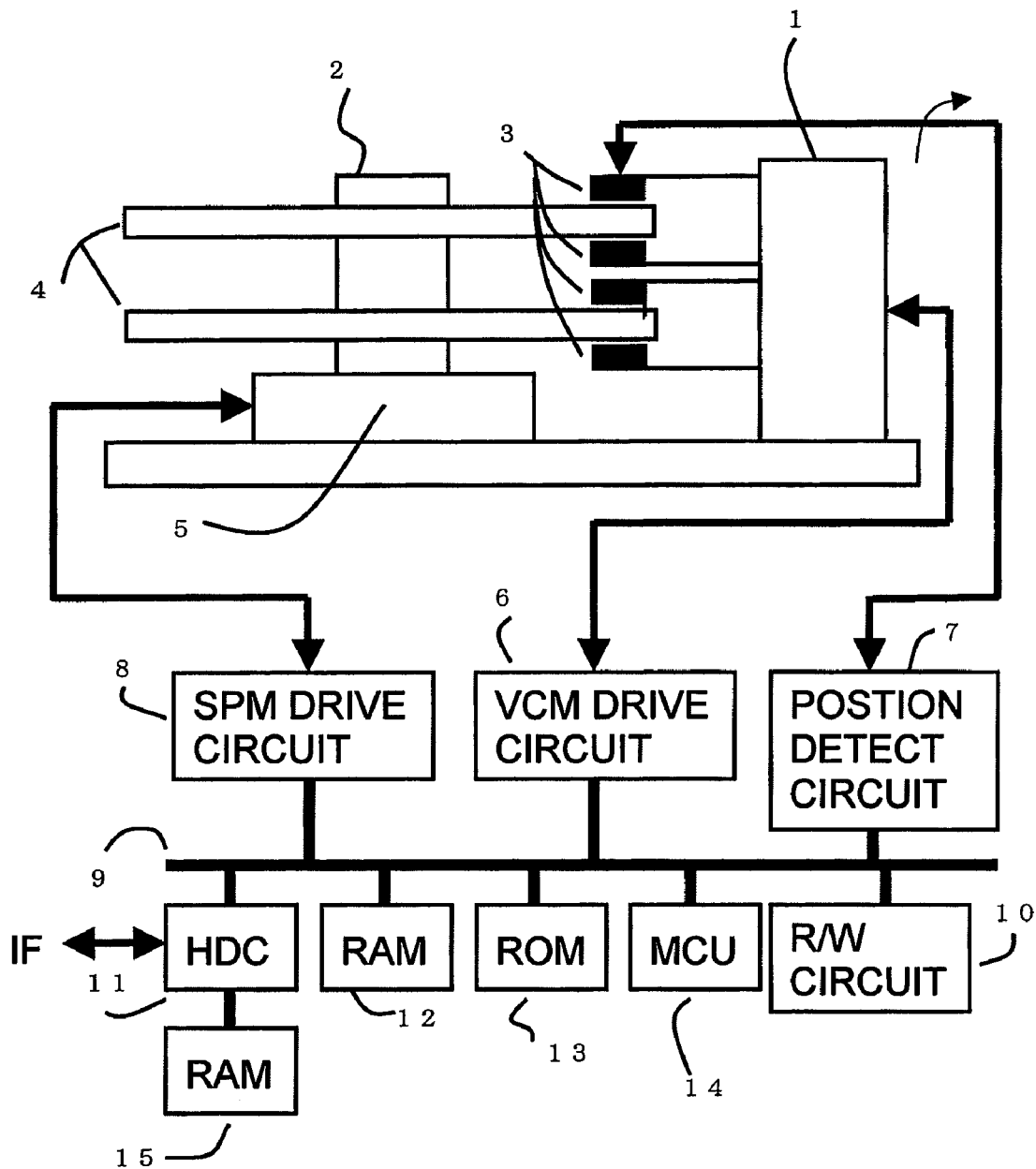
FIG. 1 is a block diagram depicting a medium storage device according to an embodiment of the present invention.

FIG. 1 is a block diagram depicting a medium storage device according to an embodiment of the present invention.

Figure 2:
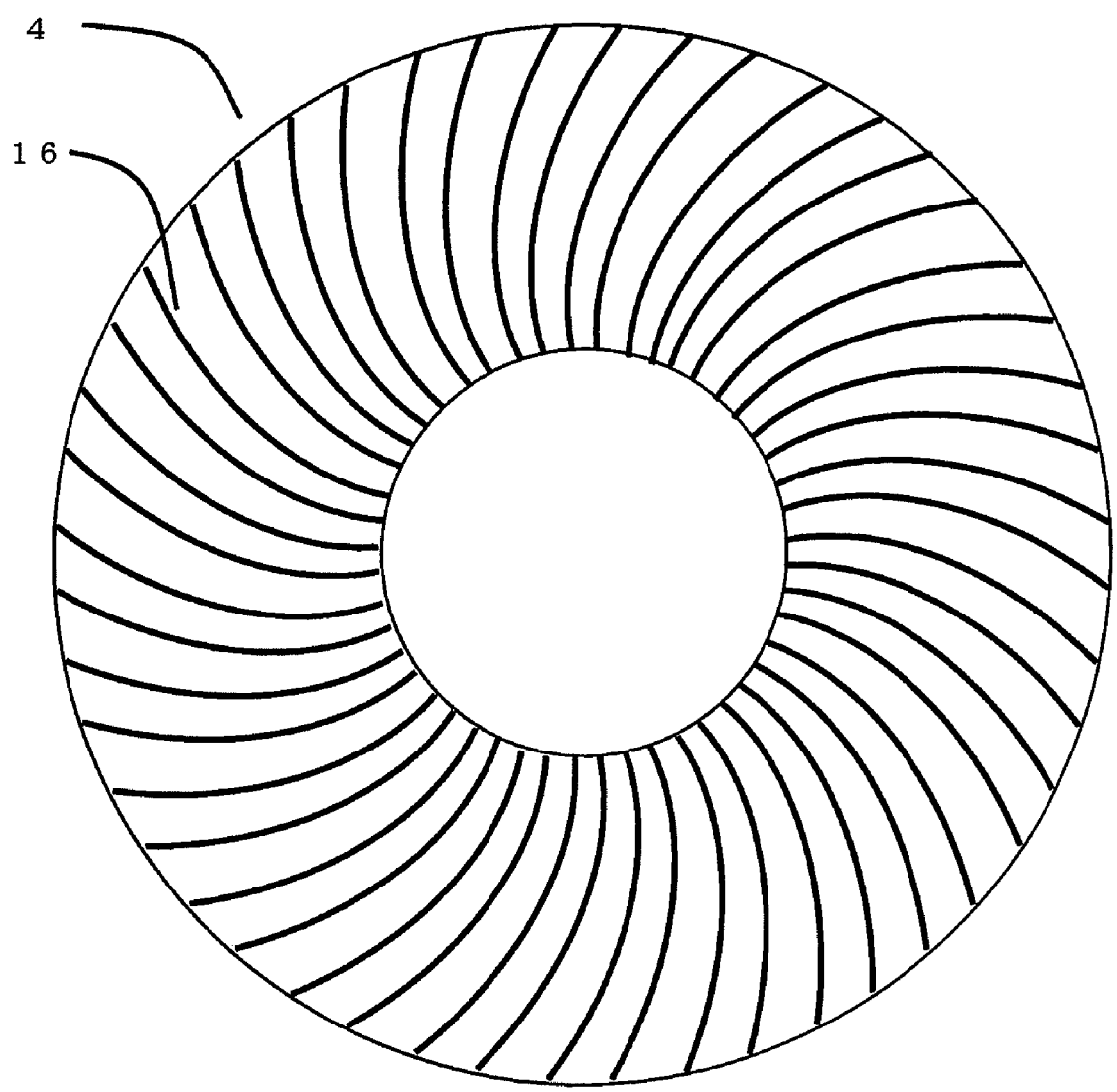
FIG. 2 is a diagram depicting the position signals of the disk in FIG. 1.
Figure 3:
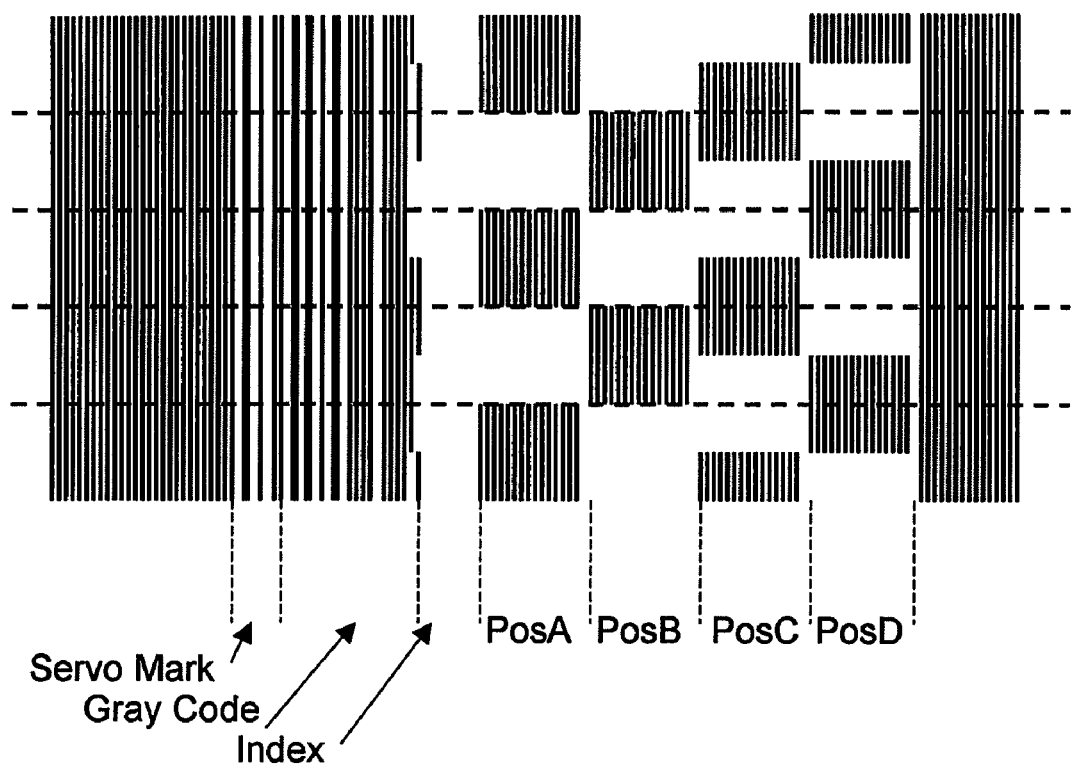
FIG. 3 is a diagram depicting the details of the position signal in FIG. 2.
Figure 4:
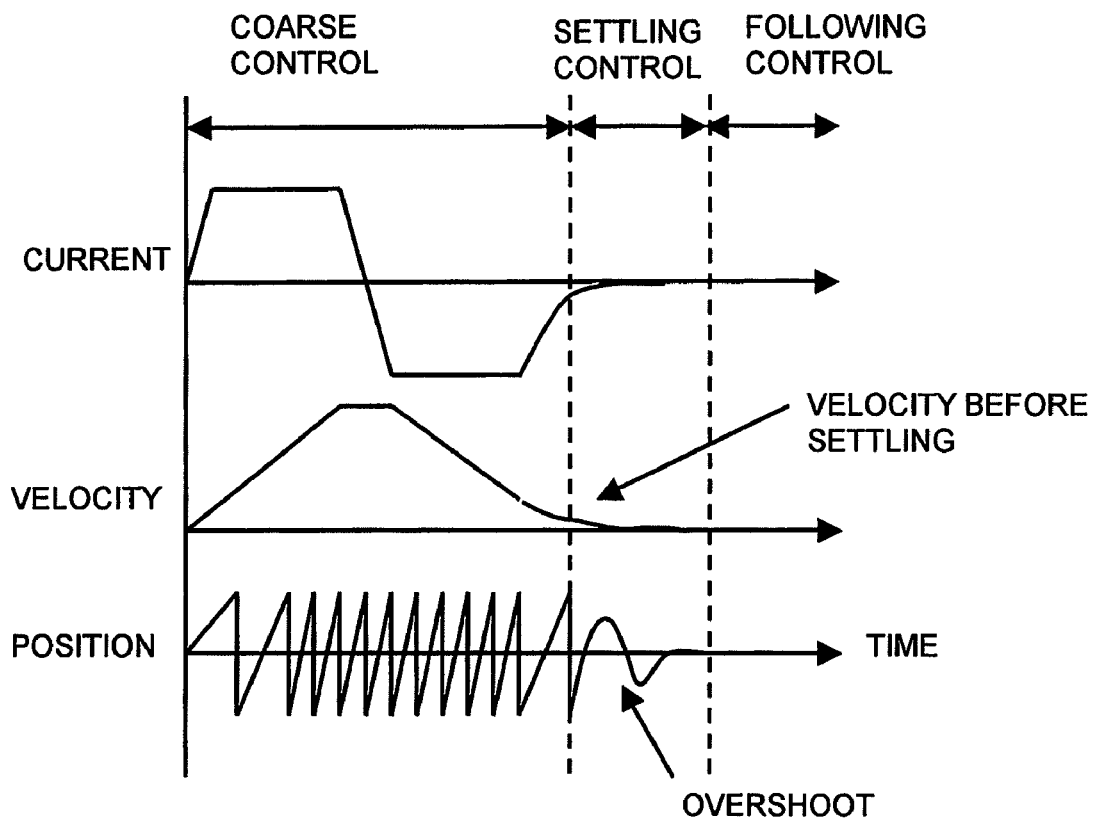
FIG. 4 is a diagram depicting the transition of seek control according to an embodiment of the present invention.

FIG. 2 is a diagram depicting the arrangement of position signals on the magnetic disk in FIG. 1, FIG. 3 is a diagram depicting a configuration of the position signals on the magnetic disk in FIG. 1 and FIG. 2, and FIG. 4 is a diagram depicting a transition of a seek control.

FIG. 1 shows a magnetic disk device as a medium storage device. As FIG. 1 shows, a magnetic disk 4, which is a magnetic storage media, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates around the rotation axis. In FIG. 1, two magnetic disks 4 are mounted on the magnetic disk device, and four magnetic heads 3 are simultaneously driven by the same actuator 1.

The magnetic head 3 has a read element and a write element. The magnetic head 3 is comprised of a read element, including a magneto-resistance (MR) element, stacked on a slider, and a write element, including a write coil, stacked thereon.

A position detection circuit 7 converts a position signal (analog signal) read by the magnetic head 3 into a digital signal. A read/write (R/W) circuit 10 controls the reading and writing of the magnetic head 3. A spindle motor (SPM) drive circuit 8 drives a spindle motor 5. A voice coil motor (VCM) drive circuit 6 supplies the drive current to the voice coil motor (VCM) 1, and drives the VCM 1.

A microcontroller (MCU) 14 detects (demodulates) a current position based on a digital position signal from the position detection circuit 7, and computes a VCM drive command value according to an error between the detected current position and a target position. In other words, a servo control, including position demodulation, seek and follow, which are described in FIG. 4 or later, is performed. A read only memory (ROM) 13 stores a control program of the MCU 14. A random access memory (RAM) 12 stores the data for processing by the MCU 14.

A hard disk controller (HDC) 11 judges a position in one track based on a sector number of a servo signal, and records/reproduces the data. A random access memory (RAM) for buffer 15 temporarily stores read data and write data. The HDC 11 communicates with a host via an interface IF, such as USB (Universal Serial Bus), ATA (AT Attached) and SCSI (Small Computer System Interface). A bus 9 connects these elements.

As FIG. 2 shows, on the magnetic disk 4, servo signals (position signals) 16 are arranged on each track in the circumference direction from the outer circumference to the inner circumference at an equal interval. Each track has a plurality of sectors, and the solid lines in FIG. 2 indicate positions where the servo signals 16 are recorded. As FIG. 3 shows, a position signal is comprised of a servo mark Servo Mark, track number Gray Code, index Index and offset information (servo burst) PosA, PosB, PosC and PosD. The dotted line in FIG. 3 shows a track center.

The position signal in FIG. 3 is read by the head 3, and a position of the magnetic head in the radius direction is detected using the track number Gray Code and the offset information PosA, PosB, PosC and PosD. The position of the magnetic head in the circumference direction is acquired based on the index signal Index.

For example, a sector number when an index signal is detected is set to No. 0, which is counted up each time a servo signal is detected, and a sector number of each sector of the track is acquired. The sector number of the servo signal becomes a reference when the data is recorded and reproduced. There is one index signal in a track. A sector number may be set instead of an index signal.

The MCU 14 in FIG. 1 confirms a position of the actuator 1 via the position detection circuit 7, performs servo computation, and supplies an appropriate current to the VCM 1. In other words, as FIG. 4 shows, the seek control transits from coarse control, settling control to following control, by which the head can be moved to a target position. In any case, a current position of the head must be detected. In this description, the settling control is included in the following control.

In order to confirm a position, servo signals are recorded in advance on the magnetic disk 4, as mentioned above in FIG. 2. In other words, as FIG. 3 shows, such signals as a servo mark which indicates a start position of a servo signal, a gray code which indicates a track number, an index signal, and PosA to PosD which indicate offset, are recorded. These signals are read by the magnetic head, and the position detection circuit 7 converts the servo signal into a digital value.

First Embodiment of Position Control System

Figure 5:
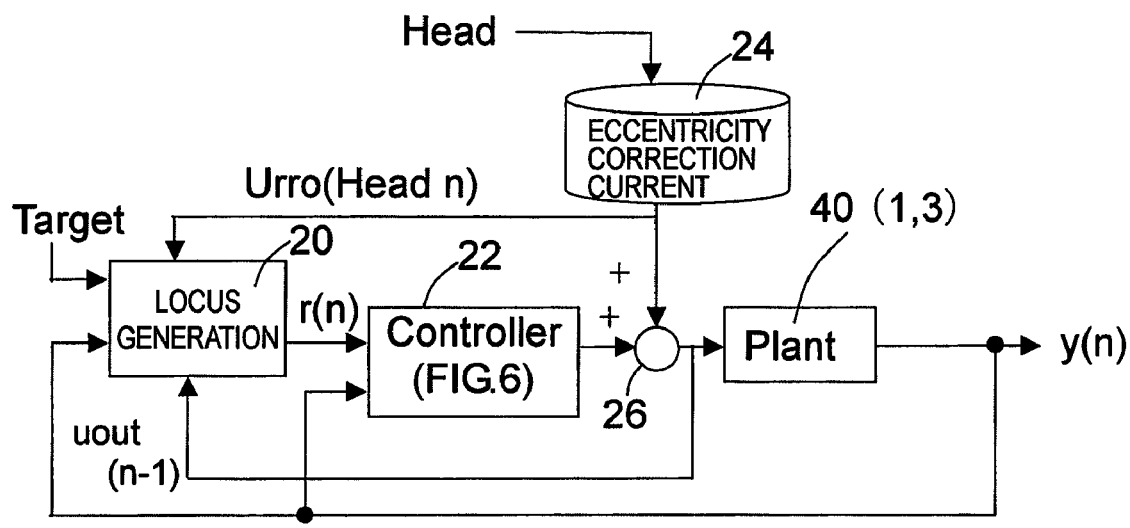
FIG. 5 is a block diagram depicting a first embodiment of the position control system of the present invention.
Figure 6:
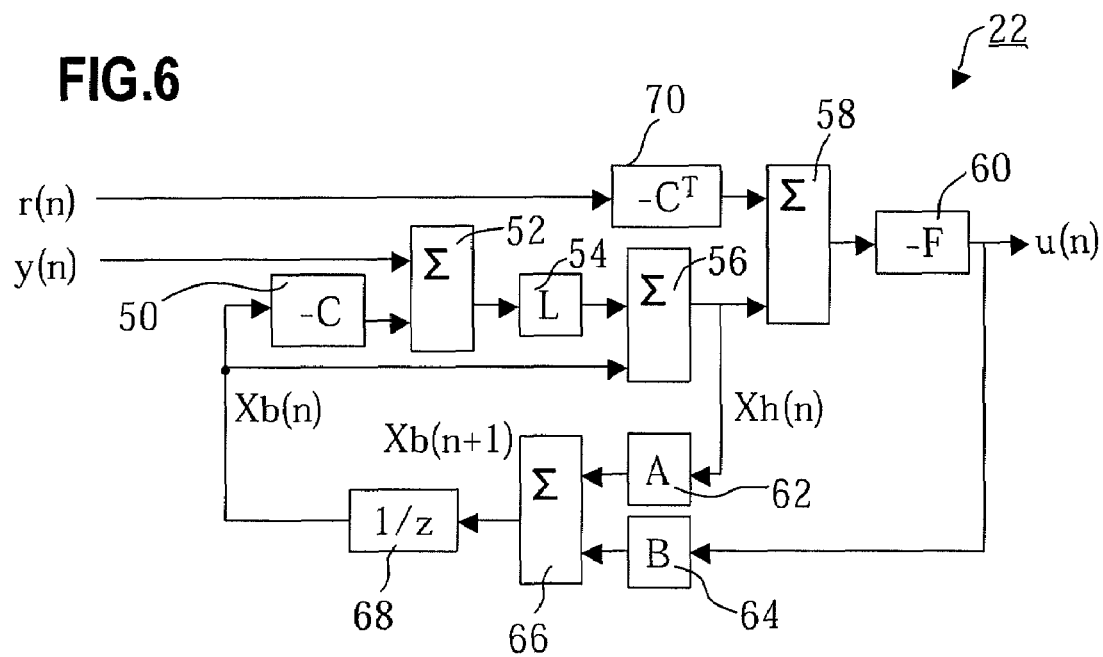
FIG. 6 is a block diagram depicting the controller of the two degree of freedom control system in FIG. 5.

FIG. 5 is a block diagram depicting a first embodiment of the position control system of the present invention, and is a block diagram of the position control system executed by the MCU 14 in FIG. 1. FIG. 6 is a block diagram of a two degree of freedom control section constituting a controller in FIG. 5.

As FIG. 5 shows, the controller 22 controls a plant (target object) 40 (actuator 1 and magnetic head 3 in FIG. 1). The controller 22 is comprised of a two degree of freedom control system, to be described in FIG. 6. An eccentricity correction current table 24 stores eccentricity correction current of each magnetic head. For example, an amplitude value of a sine wave, which is used as an eccentricity correction current, at each sample time is stored for one track of a disk.

Figure 7:
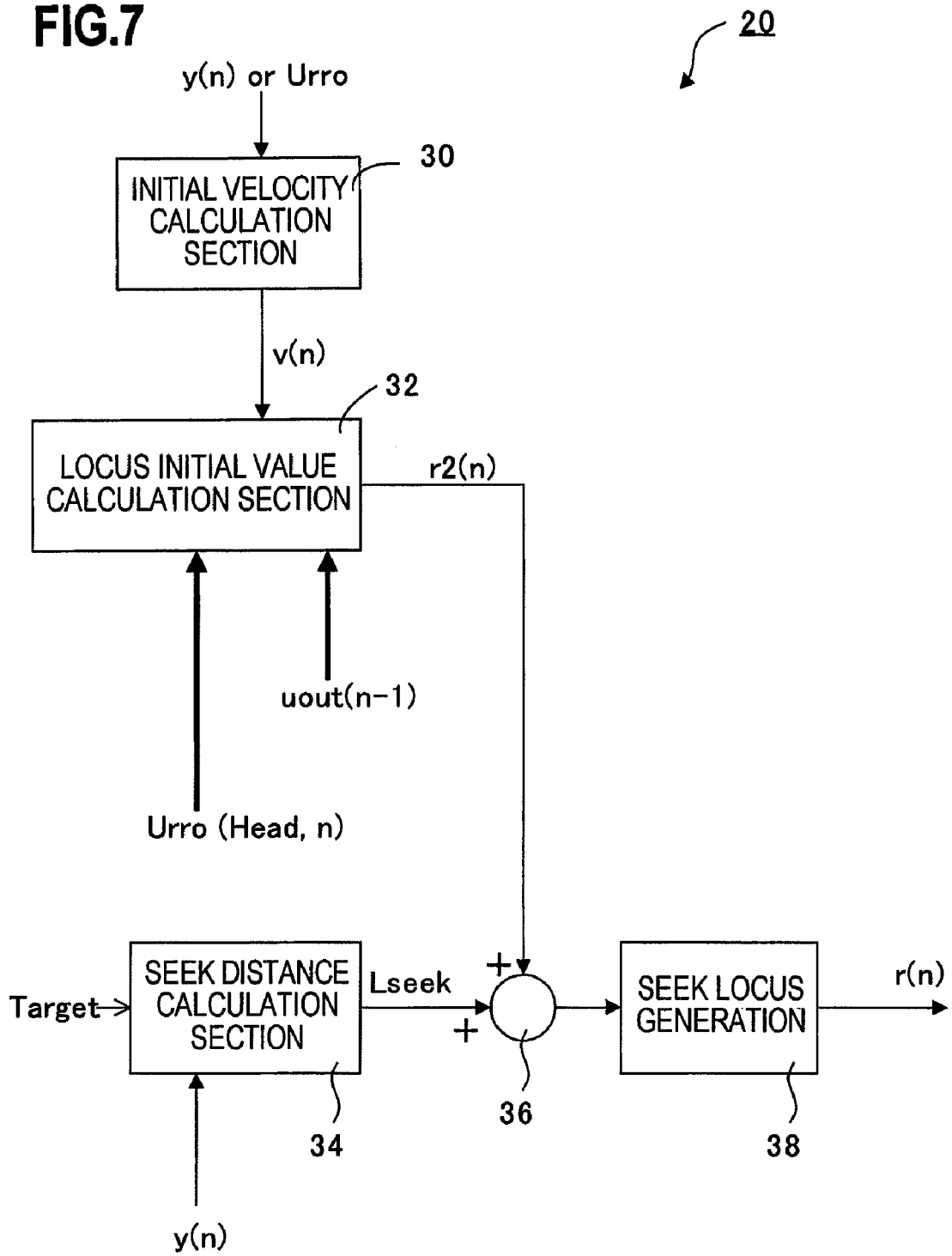
FIG. 7 is a block diagram depicting the locus generation section in FIG. 5.

A locus generation section 20 calculates a seek distance based on a target position Target and a current position y (n), as described in FIG. 7, and generates a seek locus (position) according to the seek distance. As described later, the locus generation section 20 also calculates an initial velocity, generates a locus for canceling the current step difference based on the eccentricity correction current after switching, the initial velocity and the output current value before switching, adds the locus to the seek locus, and outputs the result to the controller 22.

Now the two degree of freedom position control system, which uses a current observer constituting the controller 22, is described referring to FIG. 6. The actuator of the magnetic disk device is a rotary type. But this control system can be expressed using state equations of a linear actuator, as shown in the following Expression (1). Here "x" is a position (m), "v" is velocity (m/s), "u" is current (Ampere), "Bl" is a force constant (N/m), "m" is an equivalent mass (kg), "u" is output and "s" is a Laplace operator.

[Expression 1]

$$s\begin{pmatrix} x \\ v \end{pmatrix} = \begin{pmatrix} 0 & 1 \\ 0 & 0 \end{pmatrix}\begin{pmatrix} x \\ v \end{pmatrix} + \frac{Bl}{m}\begin{pmatrix} 0 \\ 1 \end{pmatrix}u \quad (1)$$

If the sampling period is T(s), the maximum value of current is Imax(Ampere), the track width is Lp(m/track), and the unit of position is converted to track, the unit of velocity is converted to track/sample, as the unit of current, Imax is converted to "1", and Expression (1) is expressed as a digital state equation, then Expression (2) is acquired.

[Expression 2]

$$\begin{pmatrix} x(n+1) \\ v(n+1) \end{pmatrix} = \begin{pmatrix} 1 & 1 \\ 0 & 1 \end{pmatrix}\begin{pmatrix} x(n) \\ v(n) \end{pmatrix} + \frac{Bl}{m}\frac{I_{MAX}}{Lp}T^2\begin{pmatrix} 1/2 \\ 1 \end{pmatrix}u(n) \quad (2)$$

The current position y(n) and the estimated position x(n) are in a relationship of the following Expression (3).

[Expression 3]

$$y(n) = (1 \ 0)\begin{pmatrix} x(n) \\ v(n) \end{pmatrix} \quad (3)$$

Expression (2) and Expression (3) are simplified and expressed by the following Expression (4).

[Expression 4]

$$X(n+1)=A \cdot X(n)+B \cdot u(n)$$

$$y(n)=C \cdot X(n) \quad (4)$$

Expression (4) is a result of simplifying the matrices of Expression (2) and Expression (3) using X(n+1), X(n), A, B and C. From Expression (4), the estimated observer is expressed by Expression (5).

[Expression 5]

$$X(n+1)=A \cdot X(n)+B \cdot u(n)+L \cdot (y(n)-C \cdot X(n)) \quad (5)$$

$$u(n)=-F \cdot X(n)$$

This expression is a result of converting the expression of an analog control observer into a digital expression, where "L" is a state estimation gain, which is comprised of two state estimation gains, that is, position and velocity. "F" is a feedback gain, which is also comprised of two feedback gains.

In this expression, the observation position y(n) is not reflected in the current output u(n) of the current sample. In other words, the response delays by one sample because an estimated observer format is used. In order to compensate the one sample of delay, a current observer is normally used. The current observer is expressed by the following Expression (6). Note that y(n) is an observation position of the current sample.

[Expression 6]

$$Xh(n)=Xb(n)+L(y(n)-C \cdot Xb(n)) \quad (6)$$

$$u(n)=-F \cdot Xh(n)$$

$$Xb(n+1)=A \cdot Xh(n)+B \cdot u(n)$$

In this way, a current observer for performing one operation and changing the drive current once with one sample is constructed. Then a two degree of freedom control system is constructed based on this current observer.

The feed forward of the two degree of freedom control is added to Expression (6), then Expression (7) is acquired.

[Expression 7]

$$\left. \begin{array}{l} Xh(n) = Xb(n) + L(y(n) - C \cdot Xb(n)) \\ u(n) = -F \cdot (Xh(n) - C^T \cdot r(n)) \\ Xb(n+1) = A \cdot Xh(n) + B \cdot u(n) \end{array} \right\} \quad (7)$$

Compared with the Expression (6), in the Expression (7), a feed forward term (C^T·r(n)) is added to the calculation of output u(n). In other words, as Expression (7) shows, the difference of the estimated position Xh(n) and the target position r(n) is determined and multiplied by the state feedback gain F. When the state variable Xb(n+1) of the next sample is calculated, the target position r(n) is not directly used. The target position r(n) is reflected only when u(n) is calculated.

In this way, the difference of the state estimated position and the target position is multiplied by the state feedback gain, and the other state variables are multiplied by the state feedback gain as usual, and the sum is determined to generate the current u(n).

C and C^T (transposed C) in Expression (7) are given by the following Expression (8) and Expression (9).

[Expression 8]

$$C = ( 1 \quad 0 ) \quad (8)$$

[Expression 9]

$$C^T = \begin{pmatrix} 1 \\ 0 \end{pmatrix} \quad (9)$$

This is described referring to the block diagram in FIG. 6. The difference of the observation position y(n) in the current sample "n" and the estimated position C·Xb(n) of the current sample estimated at the previous sample is computed by a computation block 52, and an estimated position error er[n] is generated. In a multiplication block 54, a correction value is generated by multiplying the estimated position error er(n) by an estimation gain L.

By an addition block 56, this correction value and Xb(n) of the estimated position and estimated velocity are added. Then Xh(n) of the estimated position and estimated velocity of the current sample in Expression (7) is generated. In the case of a normal state feedback, the estimated position of this estimated state Xh(n) is multiplied by a gain, and the estimated velocity is multiplied by a gain, and the sum of these values is determined to generate the state feedback current.

In the case of the two degree of freedom control, the value, after the estimated velocity is multiplied by the gain, is still used, but the difference of the estimated position Xh(n) and the target position locus r(n) is computed by an addition block 58, and is multiplied by a feedback gain F in a multiplication block 60, and the result is used for the state feedback. In other words, Expression (7) is computed.

On the other hand, the estimated state Xb(n+1) of the next sample (n+1) is calculated from the estimated state Xh(n) of the current sample and the output value u(n) according to Expression (7) by the multiplication blocks 62 and 64 and the addition block 66.

Here a computation block 70 multiplies the target position locus r(n) by the matrix C^T, and a delay block 68 delays the estimated state Xb(n+1) by one sample. A, B, C, C^T, L and F are matrices with respect to position x and velocity v. A, B and L are state estimation gains, and F is a feedback gain.

The current observer shown by the Expression (7) and FIG. 6 can implement two degree of freedom control only by multiplying the target locus r(n) by C^T in the Expression (9), and adding the result to the normal current observer.

Then as described in FIG. 5, the eccentricity correction current is fed forward to perform eccentricity correction. The eccentricity correction current is measured for each head and radius position in advance, and is stored in the eccentricity correction current table 24 for each head.

If the term of eccentricity correction is introduced to the above mentioned Expression (7) for the two degree of freedom control, the following Expression (10) is established. In other words, an eccentricity correction current Urro(Head, n), which is different for each head, is added to the current u(n) generated by the state F of the observer, and the current uout(n) is supplied to the actuator.

[Expression 10]

$$\begin{aligned} Xh(n) &= Xb(n) + L(y(n) - C \cdot Xb(n)) \\ u(n) &= -F \cdot (Xh(n) - C^T \cdot r(n)) \\ uout(n) &= u(n) + Urro(\text{Head}, n) \\ Xb(n+1) &= A \cdot Xh(n) + B \cdot u(n) \end{aligned}$$ (10)

In the Expression (10), when u(n) is expanded into the estimated position x(n) and the estimated velocity v(n), then the output current uout(n) in the Expression (10) is expressed by the following Expression (11).

[Expression 11]

$$uout(n) = -Fx \cdot (x(n) - r(n)) - Fv \cdot v(n) + Urro(\text{Head}, n) \quad (11)$$

Here "Fx" is a status feedback gain for the position, and "Fv" is a status feedback gain for the velocity.

In this two degree of freedom control system, the above mentioned current step difference is corrected. In other words, when position control is being performed for one head and this head is switched to another head, an initial velocity is generated because of the step difference of the eccentric correction current and eccentricity locus difference, as mentioned above. Because of this, a current step difference is generated immediately after the heads are switched. This current step difference is corrected by the target position locus r(n).

The position locus required for seek is supplied as r(n). Separate from this, if it is assumed that a position locus r2(n) is supplied in the two degree of freedom control system, Expression (10) is transformed to the following Expression (12).

[Expression 12]

$$\begin{aligned} Xh(n) &= Xb(n) + L(y(n) - C \cdot Xb(n)) \\ u(n) &= -F \cdot (Xh(n) - C^T \cdot (r(n) + r2(n))) \\ uout(n) &= u(n) + Urro(\text{Head}, n) \\ Xb(n+1) &= A \cdot Xh(n) + B \cdot u(n) \end{aligned}$$ (12)

Expression (12) is a result when the r2(n) is added, as a position locus, to the expression to determine the current u for generating the output current uout.

When u(n) is expanded into the estimated position x(n) and estimated velocity v(n) in the Expression (12), just like the Expression (11), then the output current uout in the Expression (12) is given by the following Expression (13).

[Expression 13]

$$uout(n) = -Fx \cdot (x(n) - r(n) - r2(n)) - Fv \cdot v(n) + Urro(\text{Head}, n) \quad (13)$$

In the Expression (13), x(n) is set a position error until the target position immediately after switching heads, and a same value is set for r(n). Therefore (x(n)−r(n)) is "0". In other words, immediately after switching heads, Expression (13) becomes the following Expression (14).

[Expression 14]

$$uout(n) = -Fx \cdot (-r2(n)) - Fv \cdot v(n) + Urro(\text{Head}, n) \quad (14)$$

In order to eliminate the current step difference, this current uout(n) must match the current uout(n−1) just before switching the heads. In other words, the current step difference can be eliminated if the following Expression (15) is established.

[Expression 15]

$$uout(n) = -Fx \cdot (-r2(n)) - Fv \cdot v(n) + Urro(\text{Head}, n) = uout(n-1) \quad (15)$$

If Expression (15) is solved by the locus initial value r2(n) immediately after switching heads, the following Expression (16) is acquired.

[Expression 16]

$$r2(n) = (uout(n-1) + Fv \cdot v(n) - Urro(\text{Head}, n))/Fx \quad (16)$$

In the Expression (16), v(n) is an initial velocity immediately after switching heads, Urro(Head, n) is an eccentricity correction current value with the head after switching. In other words, in the Expression (16), an initial value r2 of a locus for correcting current step difference is calculated based on the output current u(out) before switching heads, the eccentricity correction current Urro(Head, n) after switching heads, and the initial velocity v(n) at seek start after switching heads, and the position locus with which r2 becomes "0" is supplied.

In this way, if the two degree of freedom observer is used, position information for correct current step difference, including the initial velocity, can be acquired, and output current, where current step difference is canceled, can be output by one parameter. Furthermore, even if the locus is combined with the seek locus for position information, the generation of seek current, which generates noise, can be prevented.

Now an embodiment of calculating the initial value r2(n) of the corrected locus after switching heads using another parameter by the Expression (15) is described.

Before switching, tracking is performed with a head before starting seek (switching), so both position and velocity of the actuator are values close to "0". In other words, the current uout(n−1) before switching heads is determined by the eccentricity correction current Urro(OldHead, n) before switching heads.

Therefore Expression (16) is transformed into the following Expression (17).

[Expression 17]

$$r2(n) = (Urro(\text{OldHead}, n-1) + Fv \cdot v(n) - Urro(\text{New Head}, n))/Fx \quad (17)$$

In other words, the initial value of the step difference cancellation locus r2 can be determined from the difference of the eccentricity correction current and the initial velocity.

Locus Generation Section

Figure 8:
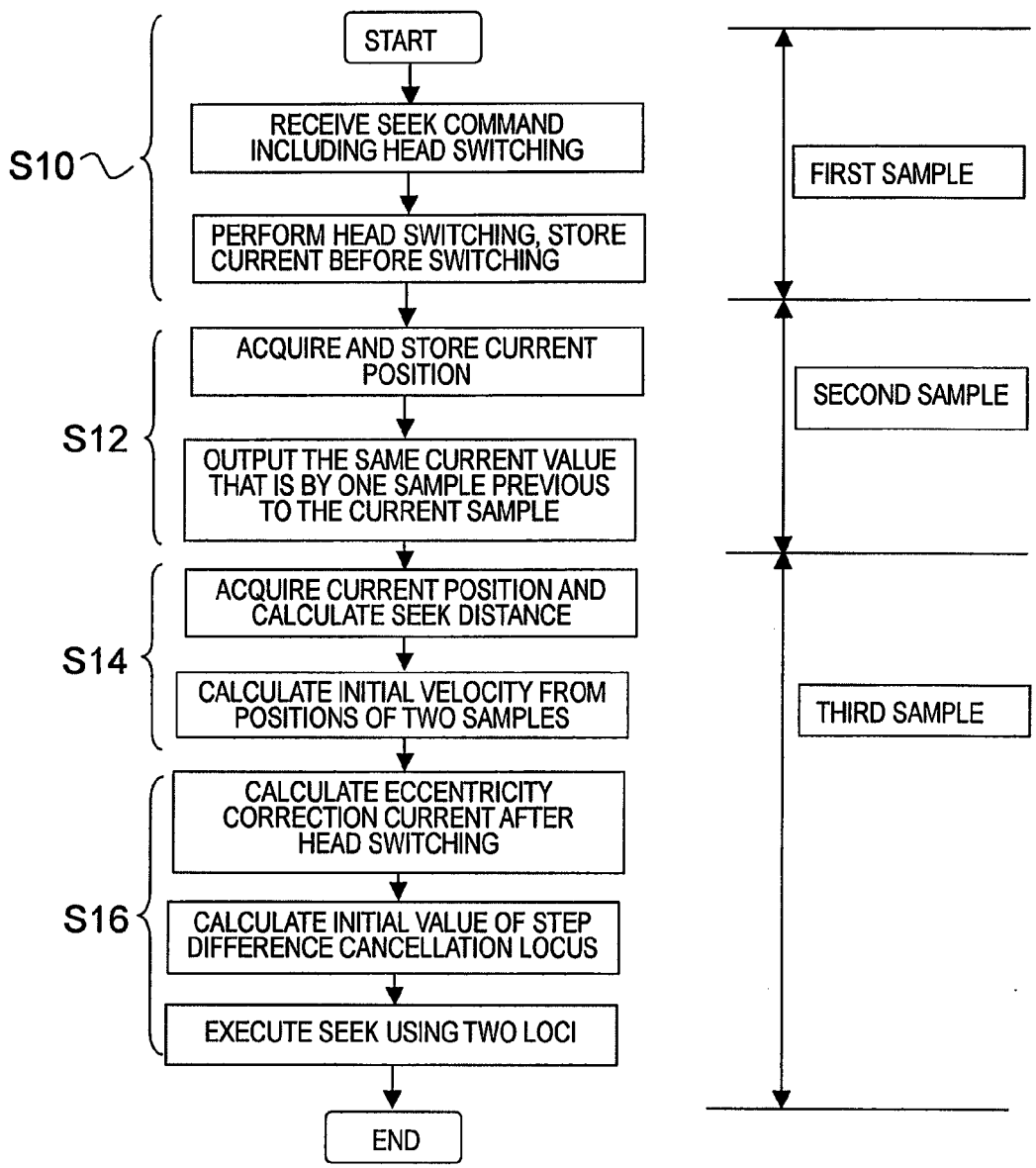
FIG. 8 is a flow chart depicting a processing of a first embodiment of the locus generation processing in FIG. 7.
Figure 9:
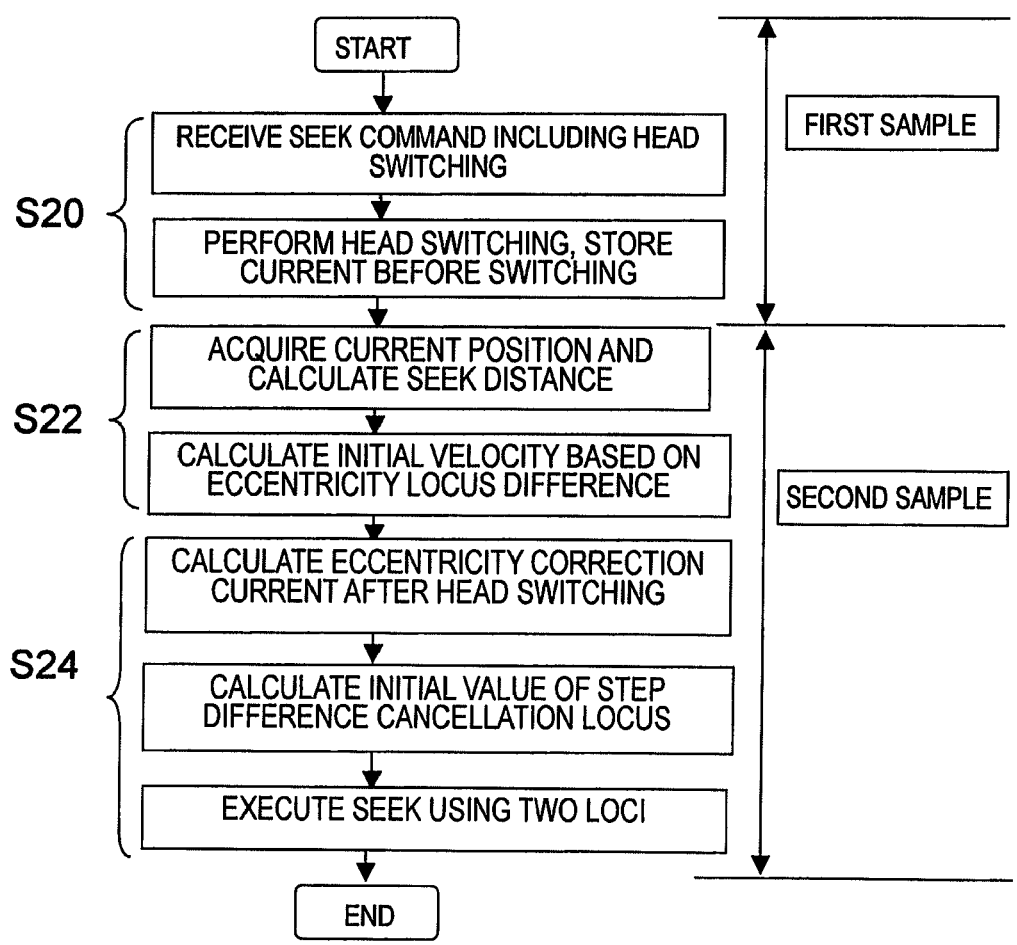
FIG. 9 is a flow chart depicting a processing of a second embodiment of the locus generation processing in FIG. 7.

FIG. 7 is a block diagram depicting the locus generation section in FIG. 5, FIG. 8 is a flow chart depicting the processing according to a first embodiment of the locus generation section, and FIG. 9 is a flow chart depicting the processing according to a second embodiment of the locus generation section.

As FIG. 7 shows, the locus generation 20 section is comprised of an initial velocity calculation section 30, a step difference cancellation locus initial value calculation section 32, a seek distance calculation section 34, an addition section 36, and a seek locus generation section 38. As described in FIG. 8, the initial velocity calculation section 30 delays the start of seek by one sample, observes positions for two samples using the head after switching, determines the difference of the positions, and calculates the initial velocity. As described in FIG. 9, the initial velocity calculation section 30 determines the difference of eccentricity correction current before and after switching heads as the amplitude and phase, or Sin and Cos coefficients, performs first-order integration for the difference current locus, and multiplies the result by a gain to calculate the initial velocity v(n).

The step difference cancellation locus initial value calculation section 32 performs calculation of Expression (16) or (17) to calculate the initial value r2(n). The seek distance calculation section 34 subtracts the current position y(n) from the target position Target to calculate the seek distance Lseek. The addition section 36 adds the seek distance Lseek and the initial value r2. The seek locus generation section 38 generates a seek position locus according to the added seek distance.

The locus generation processing of the first embodiment is described referring to FIG. 8.

(S10) When a seek command, including head switching, is received, the head switching is performed. In other words, the head for reading the servo signal (current position) in FIG. 5 is switched to a head specified by the seek command. The locus initial value calculation section 32 stores the output current uout (n−1) before switching.

(S12) After switching heads, a current position is acquired from the switched new head and stored in the initial velocity calculation section 30. The computing unit 26 outputs a current value the same as a value that is, by one sample, previous to the current sample, to the actuator.

(S14) The seek distance calculation section 34 acquires current position from the switched new head, and calculates the seek distance Lseek. At the same time, the initial velocity calculation section 30 subtracts the current position acquired in step S12 from the current position of this sample, and calculates the initial velocity.

(S16) The locus initial value calculation section 32 calculates the eccentricity correction current value Urro(NewHead, n) of this sample from the eccentricity correction current after switching heads in the eccentricity correction table 24. Then the locus initial value calculation section 32 calculates the step difference initial value r2 from the output current before switching uout(n−1), the initial velocity and the eccentricity correction current value Urro(NewHead, n), using Expression (16). The addition section 36 adds the seek distance Lseek and the step difference initial value r2, and outputs the result to the seek locus generation section 38. By this, the seek locus is input to the controller 22, and seek is started.

Now the locus generation processing of the second embodiment will be described referring to FIG. 9.

(S20) When a seek command, including head switching, is received, the head switching is performed. In other words, the head for reading the servo signal (current position) in FIG. 5 is switched to a head specified by the seek command. The locus initial value calculation section 32 stores the output current before switching uout(n−1).

(S22) After switching heads, the seek distance calculation section 34 acquires a current position from the switched new head, and calculates the seek distance Lseek. At the same time, the initial velocity calculation section 30 calculates the eccentricity correction current value Urro(NewHead, n) of this sample from the eccentricity correction current after switching heads in the eccentricity correction table 24, computes the difference between the eccentricity correction current value before switching heads Urro(OldHead, n) and the eccentricity correction current value of this sample Urro(NewHead, n), multiplies the result by a gain, converts the calculated difference into acceleration, and performs first-order integration to calculate the initial velocity.

(S24) The locus initial value calculation section 32 calculates the eccentricity correction current value Urro(NewHead, n) of this sample from the eccentricity correction current after switching heads in the eccentricity correction table 24. Then the locus initial value calculation section 32 calculates the step difference initial value r2 from the output current before switching uout(n−1), initial velocity and eccentricity correction current value Urro(NewHead, n) using Expression (16). The addition section 36 adds the seek distance Lseek and the step difference initial value r2, and outputs the result to the seek locus generation section 38. By this, the seek locus is input to the controller 22, and seek is started.

In this way, as the current step difference is corrected by acquiring the initial value of the current step difference cancellation locus based on the characteristics of the two degree of freedom control system, the initial velocity and the current step difference can be corrected by one parameter. Hence design of a correction waveform for the current step difference with respect to each seek current waveform becomes easier, and seek control, without generating vibration and noise, can be easily implemented.

Also in the present embodiment, the seek locus is generated by adding the initial value for step difference cancellation to the seek distance, so the seek time changes, but seek current is not affected by high frequency components due to the step difference correction. In other words, in the present embodiment, seek time is adjusted by adding the initial position to the seek distance, so distortion of the seek current waveform is not generated. Hence vibration and noise can be suppressed by simple control.

Furthermore, the target position locus of seek control is provided to the two degree of freedom control at the same time with head switching, so calculation of position locus r2(n) for canceling the current step difference due to head switching, and calculation of the seek locus r(n) can be performed by one calculation.

Figure 10:
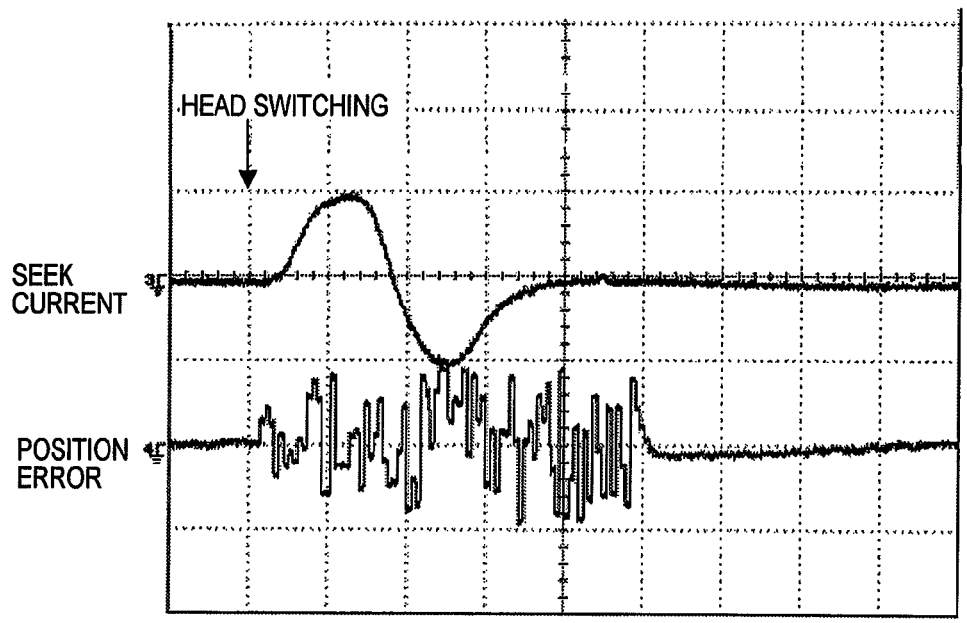
FIG. 10 is a characteristic diagram of an example of the present invention.
Figure 11:
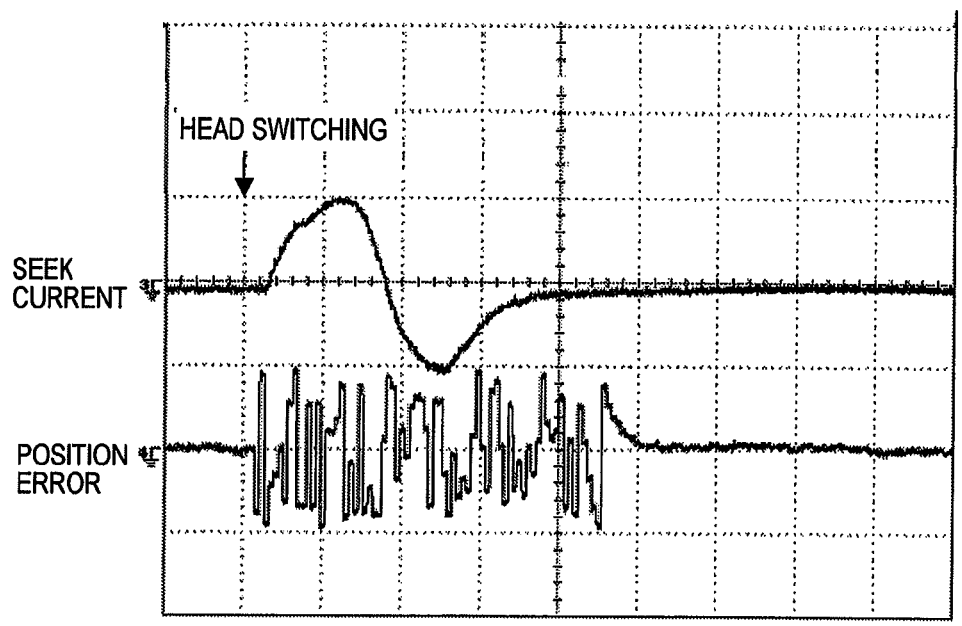
FIG. 11 is a characteristic diagram of a comparative example of the present invention.

FIG. 10 is a diagram showing the seek current waveform according to an example of the present invention, and FIG. 11 is a diagram showing the seek current waveform according to prior art as a comparative example. This embodiment was acquired by simulation, targeting 2.5 inch hard disk drives.

If the step difference current is corrected by the prior art after switching heads, as shown in FIG. 11, the seek current waveform is distorted by high frequency components at a rising portion of the seek current waveform in the initial stage of seeking. Because of the current change by high frequency components, noise (audible sound) and vibration are generated.

When the step difference current is corrected by the present invention after switching heads, as shown in FIG. 10, on the other hand, the seek current waveform is not distorted even at the rising portion of the seek current waveform in the initial stage of seeking. Therefore the generation of noise (audible sound) and vibration can be prevented.

Another Locus Generation Section

Figure 12:
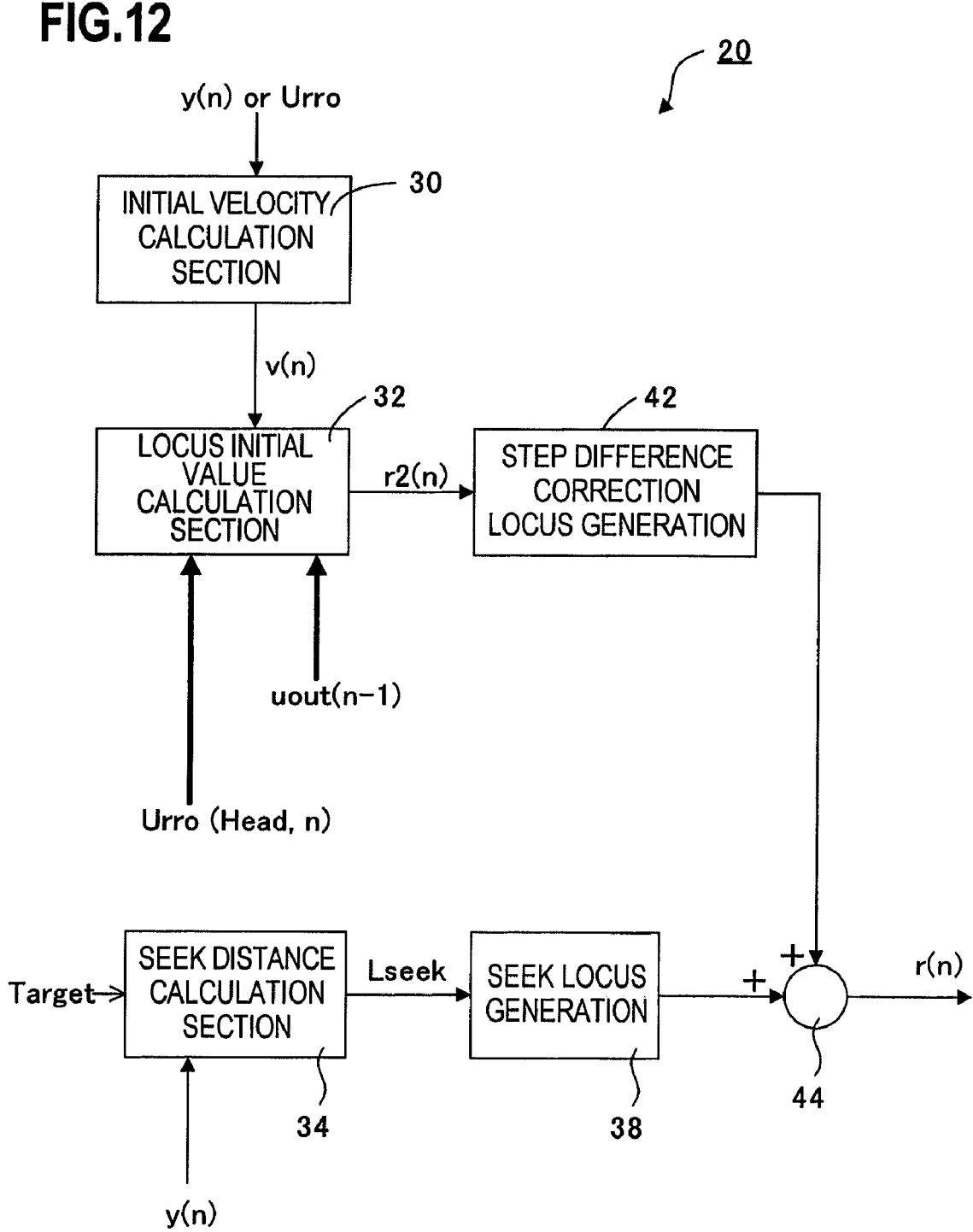
FIG. 12 is a block diagram depicting a second embodiment of the locus generation section in FIG. 5.
Figure 13:
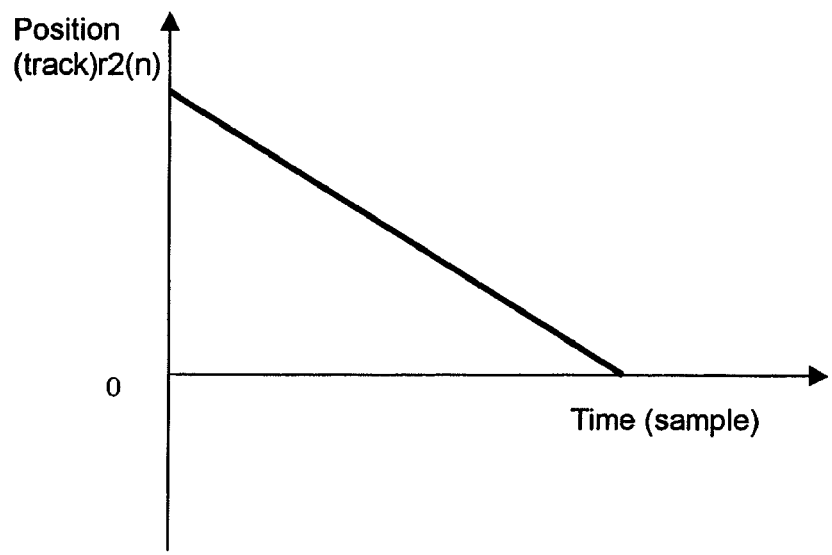
FIG. 13 is a graph of one embodiment of the step difference cancellation locus in FIG. 5.

FIG. 12 is a block diagram depicting another embodiment of the locus generation section in FIG. 5, and FIG. 13 is a graph of the step difference correction target position locus in FIG. 12. As FIG. 12 shows, the locus generation section 20 is comprised of an initial velocity calculation section 30, a step difference cancellation locus initial value calculation section 32, and a seek distance calculation section 34 as shown in FIG. 5.

The locus generation section 20 also has a step difference correction locus generation section 42, an addition section 44 and a seek locus generation section 38. As described in FIG. 8, the initial velocity calculation section 30 delays the start of seek by one sample, observes the positions for two samples using a head after switching, determines the difference of the positions, and calculates the initial velocity. Or, as described in FIG. 9, the initial velocity calculation section 30 determines the difference of eccentricity correction current before and after switching heads as the amplitude and the phase, or Sin and Cos coefficients, performs first-order integration for the difference current locus, and multiplies the result by a gain to calculate the initial velocity v(n).

The step difference cancellation locus initial value calculation section 32 performs calculation of Expression (16) or (17) to calculate the initial value r2(n). The seek distance calculation section 34 subtracts the current position y(n) from the target position Target to calculate the seek distance Lseek. The seek locus generation section 38 generates a seek position locus according to the calculated seek distance.

The step difference correction locus generation section 42 receives the step difference cancellation locus initial value r2(n), as shown in FIG. 13, and generates a step difference correction target position locus, which gradually becomes "0" from the initial value as time elapses. The addition section 44 adds the seek locus and the step difference correction target position locus, and outputs the result to the controller 22.

In this example as well, the current step difference is corrected by acquiring the initial value of the current step difference cancellation locus based on the characteristics of the two degree of freedom control system, so initial velocity and current step difference can be corrected by one parameter. Hence design of a correction waveform for the current step difference, with respect to each seek current waveform, becomes easier, and seek control, without generating vibration and noise, can be easily implemented. Furthermore, seek time is not changed, so the influence on seek performance can be prevented.

Figure 14:
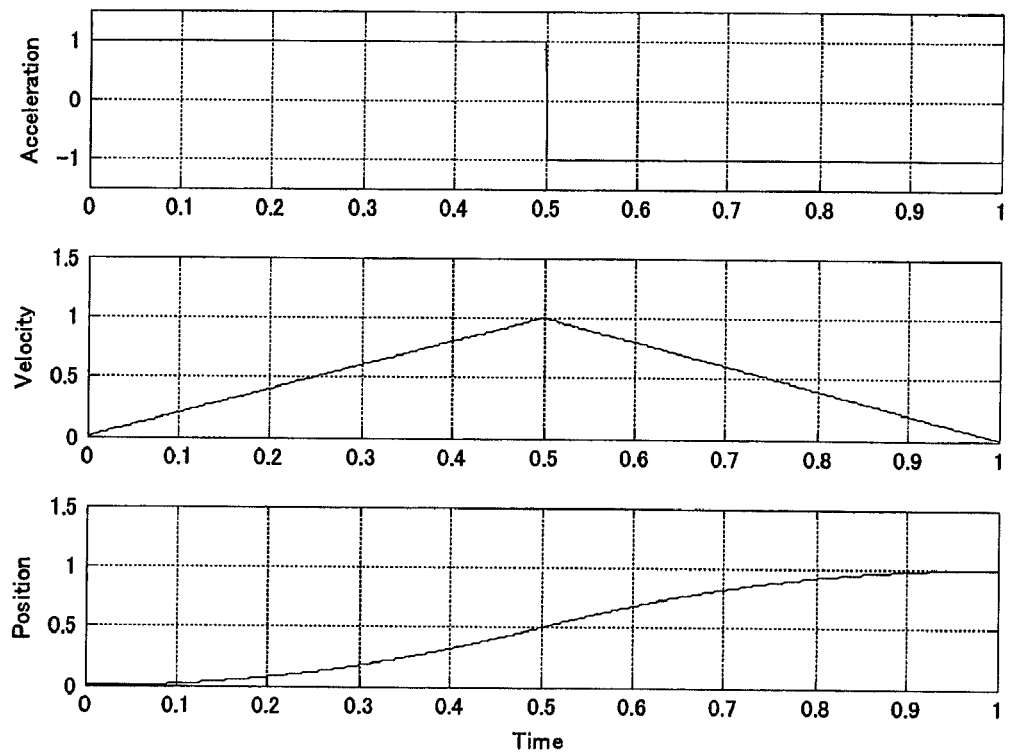
FIG. 14 is graphs of another embodiment of the step difference cancellation locus of the present invention.

Now other (current) step difference cancellation loci are described. FIG. 14 shows an example of a quadratic function locus. In FIG. 14, the top graph shows the characteristics of acceleration, the middle graph shows the characteristics of velocity, and the bottom graph shows the characteristics of position with respect to time. A quadratic function locus is the result of a rectangular wave integrated twice, and the position locus in FIG. 13 can be used. Compared with the triangular wave in FIG. 13, a slightly more curved characteristic is shown, which is more effective in preventing noise and vibration.

Figure 15:
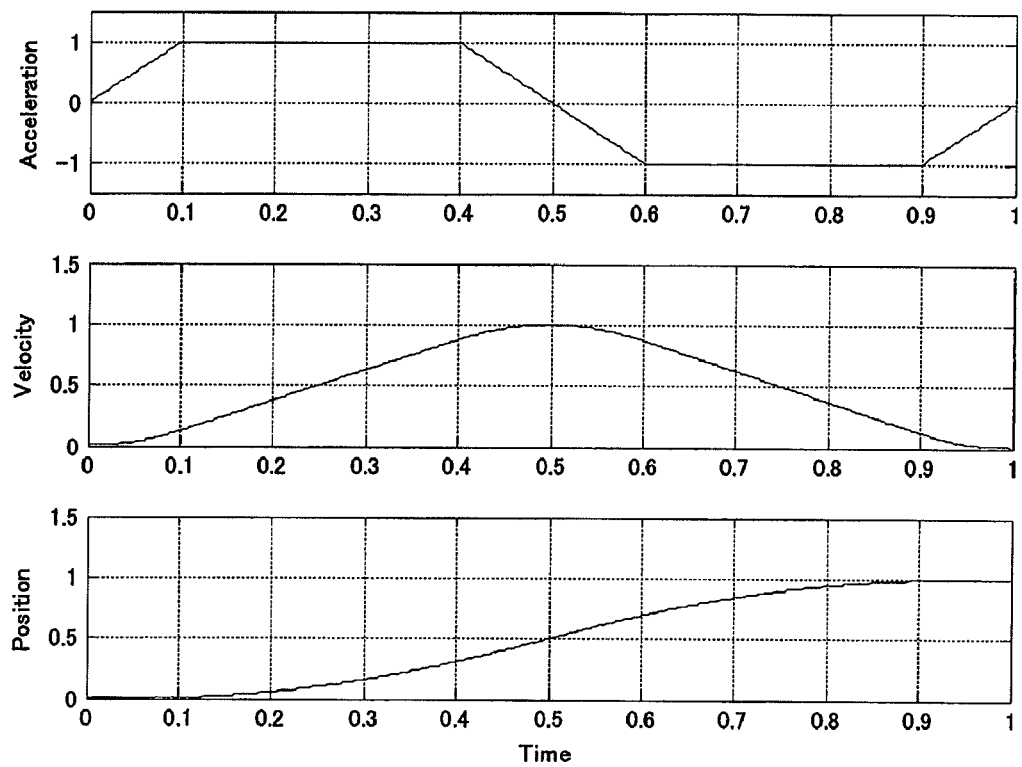
FIG. 15 is graphs of a third embodiment of the step difference cancellation locus of the present invention.

FIG. 15 shows an example of a trapezoidal locus. In FIG. 15, the top graph shows the characteristics of acceleration, the middle graph shows the characteristics of velocity, and the bottom graph shows the characteristics of position with respect to time. Compared with the triangular wave in FIG. 13, the trapezoidal locus presents a more curved position characteristic, which is more effective in preventing noise and vibration.

Figure 16:
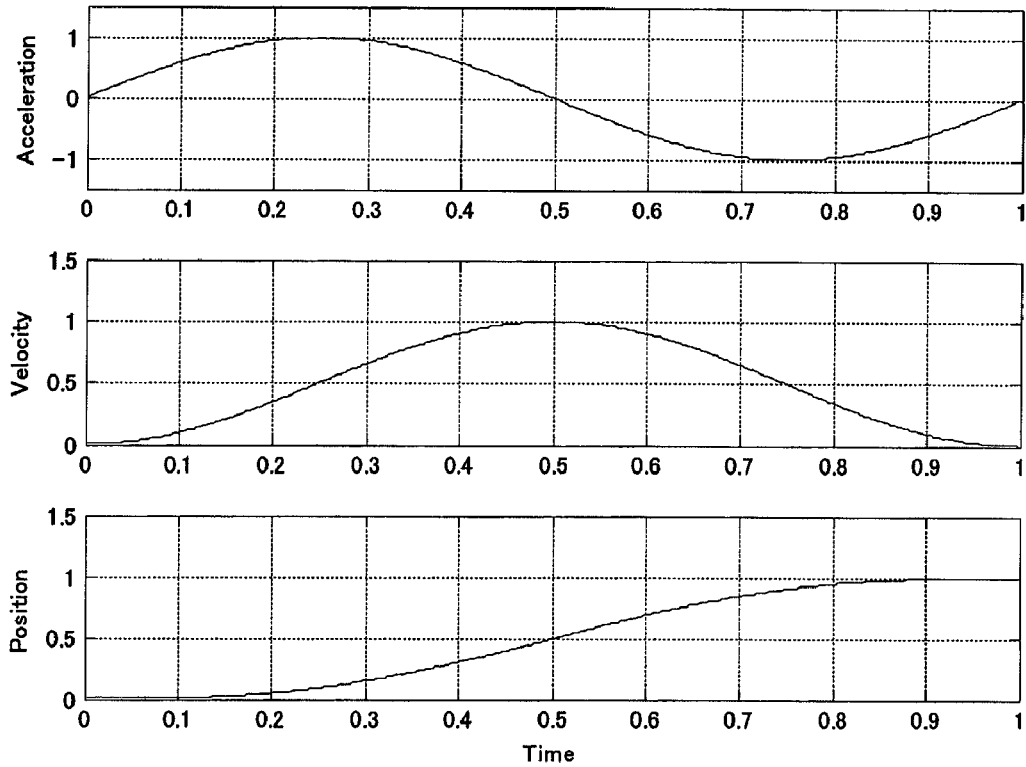
FIG. 16 is graphs of a fourth embodiment of the step difference cancellation locus the present invention.

FIG. 16 shows a sine wave locus. In FIG. 16, the top graph shows the characteristics of acceleration, the middle graph shows the characteristics of velocity, and the bottom graph shows the characteristics of position with respect to time. Compared with the triangular wave in FIG. 13, the sine wave position locus presents a more curved position characteristic, which is more effective in preventing noise and vibration.

Figure 17:
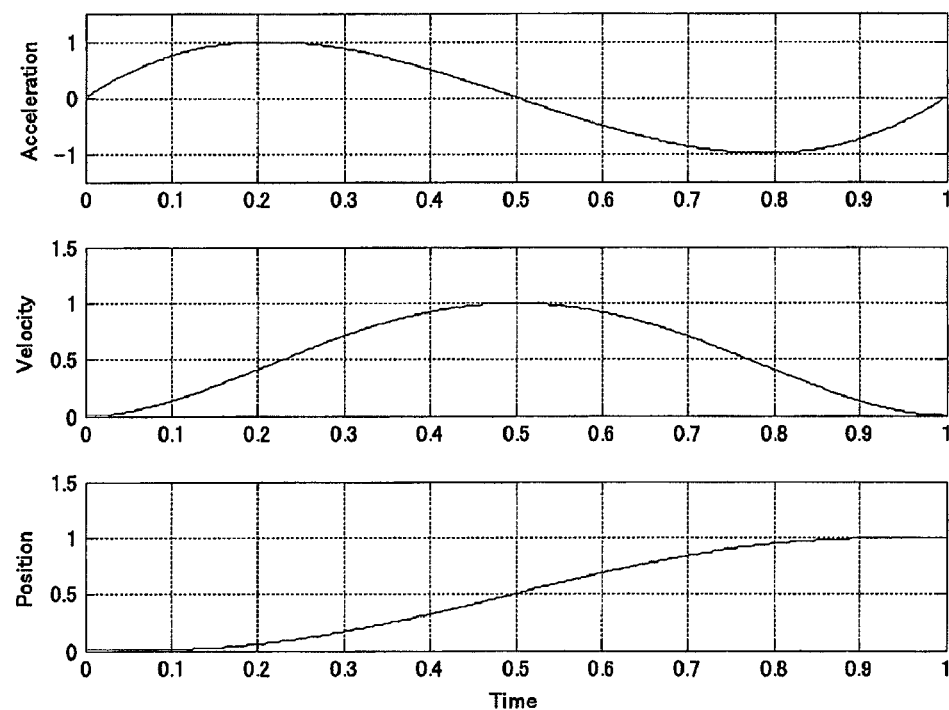
FIG. 17 is graphs of a fifth embodiment of the step difference cancellation locus of the present invention.

FIG. 17 shows a SMART locus. In FIG. 17, the top graph shows the characteristics of acceleration, the middle graph shows the characteristics of velocity, and the bottom graph shows the characteristics of position with respect to time. The SMART locus was introduced in the above mentioned Japanese Patent Application Laid-Open No. 2004-022133 (FIGS. 5 to 7), and is an improved sine wave locus, and presents a more curved position characteristic compared with the triangular wave in FIG. 13, which is more effective in preventing noise and vibration.

Figure 18:
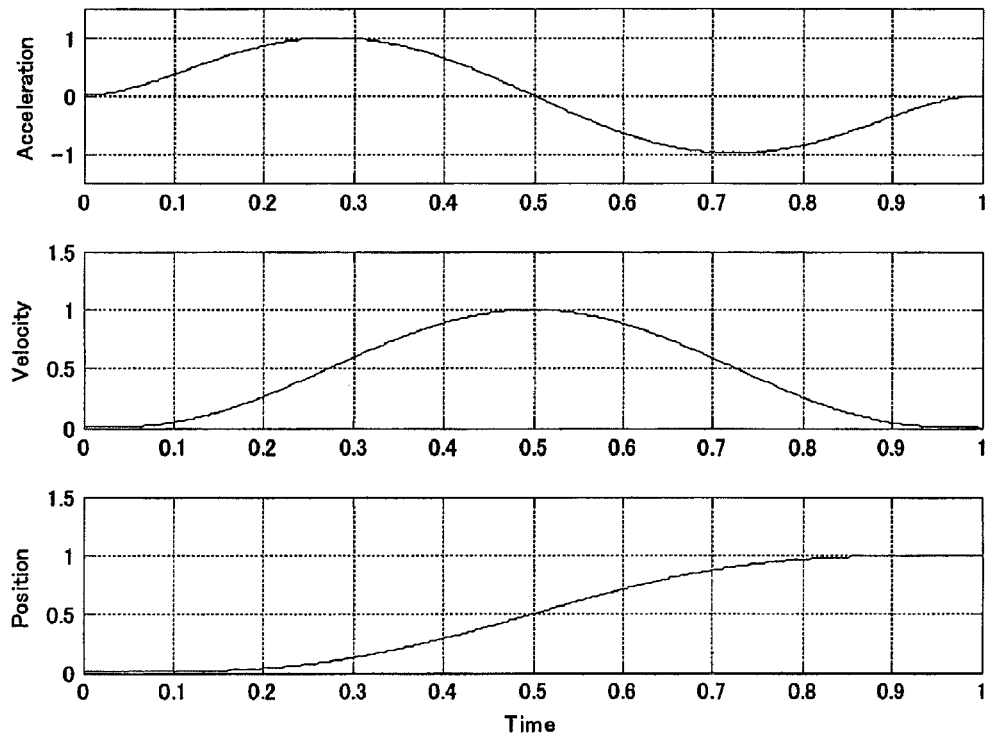
FIG. 18 is graphs of a sixth embodiment of the step difference cancellation locus of the present invention.

FIG. 18 shows a SMART-Like locus. In FIG. 18, the top graph shows the characteristics of acceleration, the middle graph shows the characteristics of velocity, and the bottom graph shows the characteristics of position with respect to time. The SMART-Like locus was introduced in the above mentioned Japanese Patent Application Laid-Open No. 2004-022133 (FIGS. 5 to 7), and is a further improved sine wave locus, and presents a more curved position characteristic compared with the triangular wave in FIG. 13, which is more effective in preventing noise and vibration.

In this way, various shapes of step difference cancellation loci can be used according to the required characteristics, with the initial value as r2(n).

Second Embodiment of Position Control System

Figure 19:
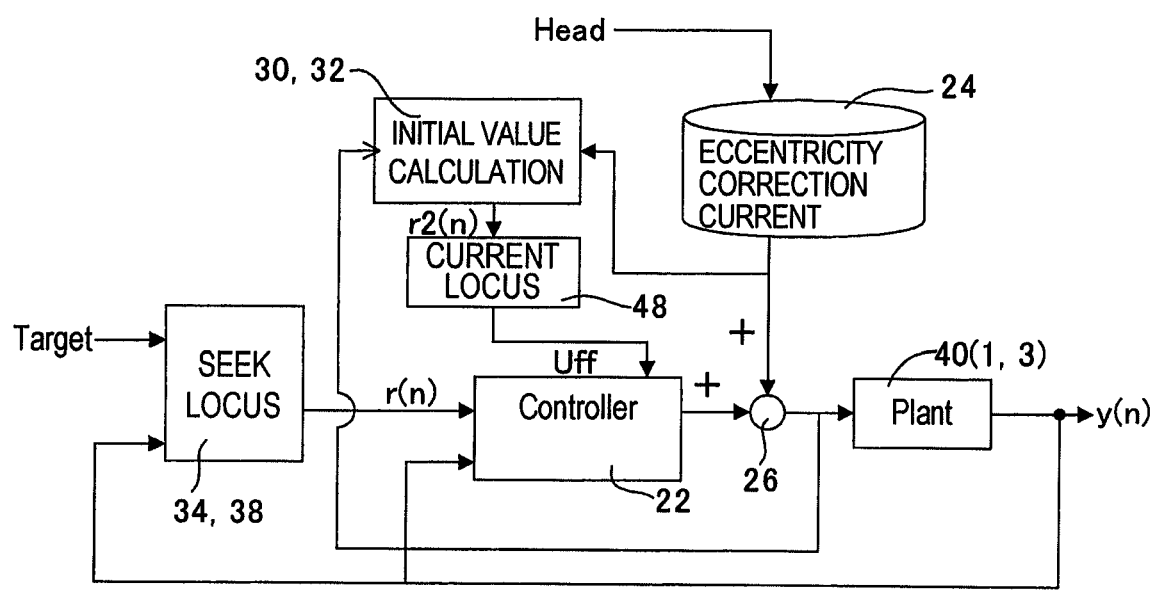
FIG. 19 is a block diagram depicting a second embodiment of the position control system of the present invention.
Figure 20:
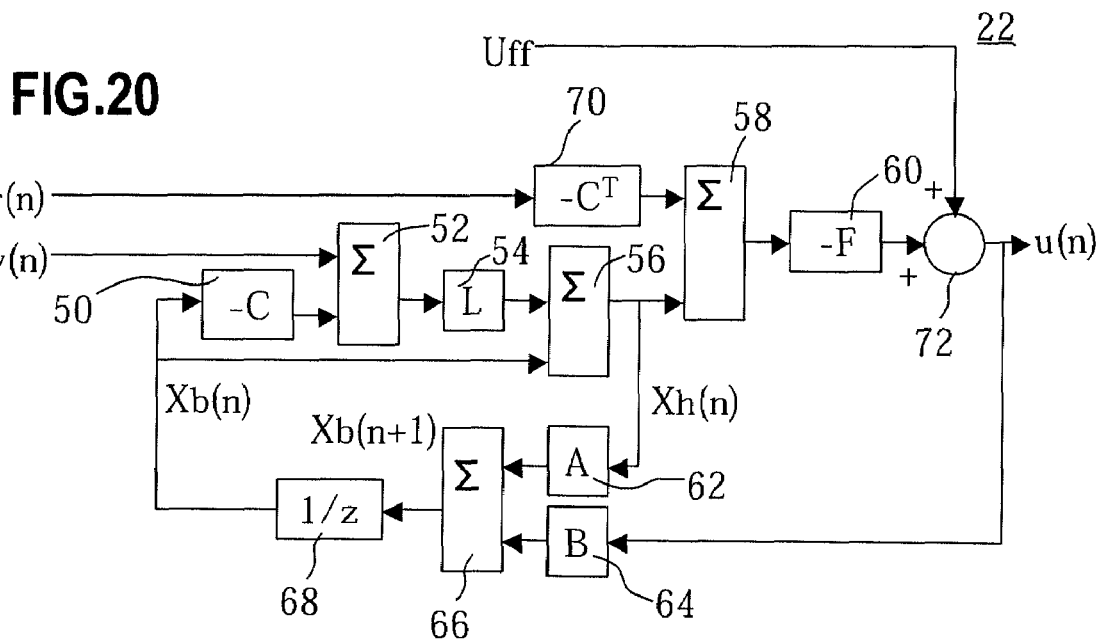
FIG. 20 is a block diagram depicting the two degree of freedom current observer in FIG. 19.
Figure 21:
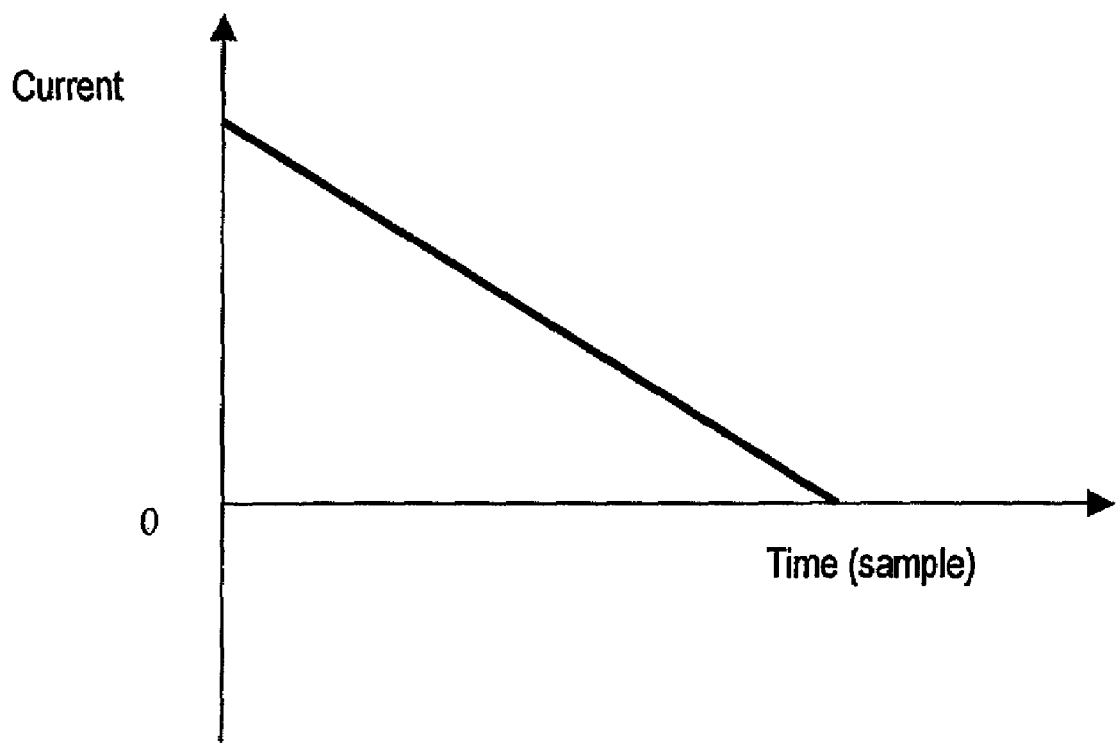
FIG. 21 is a graph of the step difference cancellation current locus in FIG. 19.

FIG. 19 is a block diagram depicting a second embodiment of the position control system of the present invention, and is a block diagram of the positioning control system, which is executed by the MCU 14 in FIG. 1. FIG. 20 is a block diagram depicting a two degree of freedom control section constituting the controller in FIG. 19, and FIG. 21 is a graph showing an example of the current locus in FIG. 19.

In the embodiment in FIG. 19, a current, instead of a position, is provided to the two degree of freedom control system as a step difference correction signal. In other words, r2(n), which indicates a position, in the Expressions (16) and (17), is multiplied by $-Fx$, then the result is indicated in current units. This is expressed by the following the Expression (18).

[Expression 18]

$$U\!f\!f = Fx \cdot r2 \quad (18)$$

In the first embodiment, a target position locus is provided to the two degree of freedom control system using Expression (12), but an FF current Uff (Fx·r2) can be provided instead of the target position locus by using this Expression (18). Hence Expression (12) can be transformed to the following Expression (19).

[Expression 19]

$$Xh(n) = Xb(n) + L(y(n) - C \cdot Xb(n))$$

$$u(n) = -F \cdot (Xh(n) - C^T \cdot r(n)) + U\!f\!f(n) \quad (19)$$

$$u\text{out}(n) = u(n) + Urro(\text{Head}, n)$$

$$Xb(n+1) = A \cdot Xh(n) + B \cdot u(n)$$

As the block diagram in FIG. 19 shows, the controller 22 controls a plant (target object) 40 (actuator 1 and magnetic head 3 in the case of FIG. 1), just like FIG. 5. The controller 22 is comprised of a two degree of freedom control system, which is described in FIG. 20. An eccentricity correction current table 24 stores the eccentricity correction current of each magnetic head. For example, a sine wave is used as the eccentricity correction current, and an amplitude value of the sine wave at each sample time is stored for one track of the disk.

As described in FIG. 7, a seek locus generation section 34, 38 has a seek distance calculation section 34, which calculates a seek distance from a target position Target and a current position y(n), and a seek locus generation section 38, which generates a seek locus (position) according to the seek distance.

An initial value calculation section 30, 32 is comprised of an initial velocity calculation section 30 which calculates an initial velocity, and a locus initial value calculation section 32 which calculates an initial value of a current step difference cancellation position locus from an eccentricity correction current and initial velocity after switching, and an output current value before switching. A current locus generation section 48 calculates an initial value Uff of the current locus from the initial value r2 according to Expression (18), generates a step difference correction current locus that gradually becomes "0" from the initial value as time elapses, such as the triangular waveform shown in FIG. 21, and outputs the locus to the controller 22.

The two degree of freedom control system 22, on the other hand, has a configuration for executing Expression (19), as shown in FIG. 20. In other words, in addition to the configuration described in FIG. 7, an addition section 72, which adds the output of a computing unit 60 and the output of the current locus generation section 48, and outputs the result to the actuator 40, is provided in the output stage of the computing unit 60.

In this example as well, the current step difference is corrected by acquiring an initial value of the current step difference cancellation locus, and converting it into current, using the characteristics of the two degree of freedom control system, so one parameter (current locus) can correct the initial velocity and the current step difference. Hence design of a correction waveform, of the current step difference with respect to each seek current waveform, becomes easier, and seek control without generating vibration and noise can be easily implemented. Furthermore seek time is not changed, so influence on the seek performance can be prevented.

Third Embodiment of Position Control System

Figure 22:
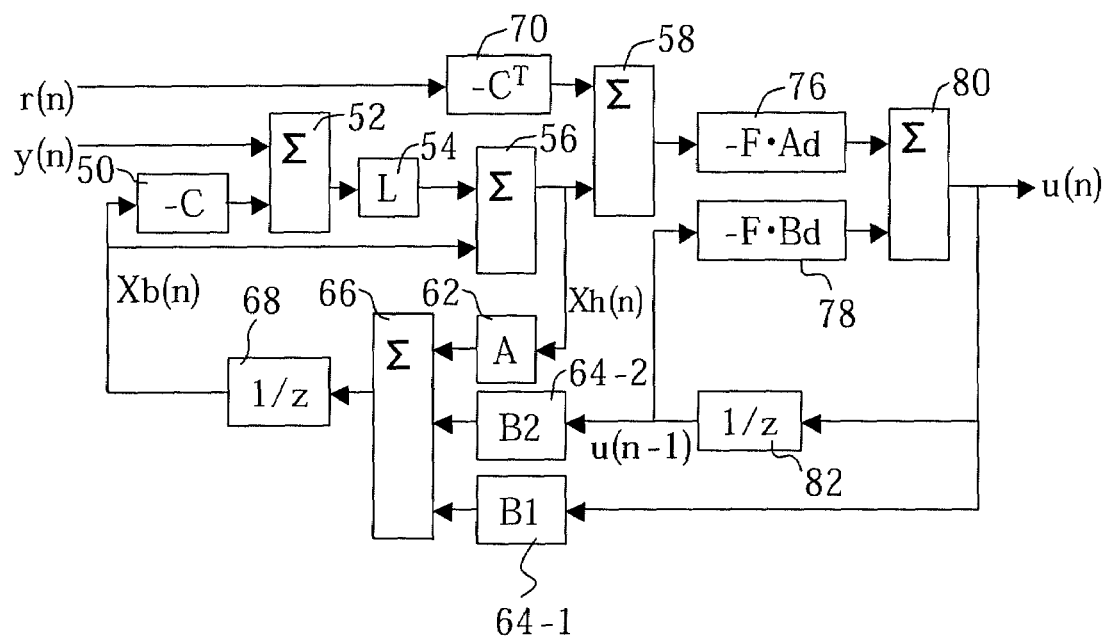
FIG. 22 is a block diagram depicting a current observer of a third embodiment of the position control system of the present invention.

FIG. 22 is a block diagram depicting a third embodiment of the position control system of the present invention, and shows only a current observer constituting a controller 22. According to this embodiment, in a sample servo control, a delay is generated in a period from sample time to output because of the calculation time and the delay of an analog driver circuit. In other words, a so called "output delay" is generated.

In this embodiment, a configuration of a current observer considering the output delay is used. A state variable X, at a time which is delayed (advanced) from the sample time n by Td, is determined in the same way as Expression (1), and can be expressed as the following Expression (20).

[Expression 20]

$$X(n+Td/T) = Ad \cdot X(n) + Bd \cdot u(n-1) \quad (20)$$

If Expression (20) is expressed by an actuator model, just like Expression (1), then Expression (21) is established. In Expression (21), Td, which is a time unit, is converted into sample count n, so Td is divided by a sampling cycle T to convert it into a sample count.

[Expression 21]

$$\begin{pmatrix} x(n+Td/T) \\ v(n+Td/T) \end{pmatrix} = \begin{pmatrix} 1 & Td/T \\ 0 & 1 \end{pmatrix} \begin{pmatrix} x(n) \\ v(n) \end{pmatrix} + \frac{Bl}{m} \frac{I_{MAX}}{Lp} T^2 \begin{pmatrix} Td^2/T^2/2 \\ Td/T \end{pmatrix} u(n-1) \quad (21)$$

This current observer Expression (21) can be converted into the following Expression (22) in the same way as the above mentioned Expression (6).

[Expression 22]

$$Xh(n) = Xb(n) + L(y(n) - C \cdot Xb(n))$$

$$Xh(n+Td/T) = Ad \cdot Xh(n) + Bd \cdot u(n-1) \quad (22)$$

$$u(n) = -F \cdot Xh(n+Td/T)$$

$$Xb(n+1) = A \cdot Xh(n) + B1 \cdot u(n) + B2 \cdot u(n-1)$$

In the Expression (22), Xh(n) is an estimated state at current sample n, and Xh(n+Td/T) is an estimated state when time is advanced from the current sample n by Td.

In the Expression (22), the estimated state Xh(n) in current sample n is determined, then the state Xh(n+TD/T), when time is advanced by time Td considering the delay, is calculated from the estimated state Xh(n) in the current sample n and the output value u(n-1) of the previous sample.

In order to estimate a state of the next sample, output of the current sample u(n) is normally used as shown in Expression (6), but in this example, u(n) has not been calculated at the sample point because of single rate control, that is, one data is output at one sample. Therefore the state Xh(n+Td/T), at a time advanced by time Td, is calculated using the output u(n-1) of the previous sample, which has already been calculated. Then the output u(n) in the current sample n is calculated from the calculated Xh(n+Td/T) at a time advanced by the time Td.

Unlike Expression (6), the estimated state Xb(n+1) of the next sample in Expression (22) uses u(n) and u(n-1).

When feed forward of the two degree of freedom control is added to the Expression (22), Expression (23) is acquired. In other words, compared with the Expression (22), the feed forward term (C^T·r(n)) is added to the calculation of Xh(n+Td/T) in Expression (23).

[Expression 23]

$$Xh(n) = Xb(n) + L(y(n) - C \cdot X(n))$$

$$Xh(n+Td/T) = Ad \cdot (Xh(n) - C \cdot r(n)) + Bd \cdot u(n-1) \quad (23)$$

$$u(n) = -F \cdot Xh(n+Td/T)$$

$$Xb(n+1) = A \cdot Xh(n) + B1 \cdot u(n) + B2 \cdot u(n-1)$$

In this case, if the conventional Expression (7) for two degree of freedom control is used, the feed forward term is directly added to the calculation expression of the output u(n). This, however, means subtracting (C^T·r(n)) from Xh(n+Td/T), of which sample point is different, which makes the calculation sequence complicated, and high-speed calculation difficult. Furthermore, the state estimation sequence may change, and maintaining the stability of the entire system may become difficult.

Therefore the feed forward term (C^T·r(n)) is added to Xh(n), of which sample point is the same, to calculate the advanced state Xh(n+Td/T).

Then the second expression of the Expression (23) is substituted for the third expression to simplify Expression (23), and the following Expression (24) is acquired.

[Expression 24]

$$Xh(n)=Xb(n)+L(y(n)-C \cdot Xb(n))$$

$$u(n)=-F \cdot Ad \cdot (Xh(n)-C^T \cdot r(n))-F \cdot Bd \cdot u(n-1)$$

$$Xb(n+1)=A \cdot Xh(n)+B1 \cdot u(n)+B2 \cdot u(n-1) \quad (24)$$

FIG. 22 is a block diagram of Expression (24), where the same blocks as FIG. 7 are denoted with the same symbols. As FIG. 22 shows, the observation position (position error) in the current sample n y(n) is received, and the difference of the estimated position of the current sample C·Xb(n), which was estimated in the previous sample, and the observation position y(n), is calculated by a computing block 52, so as to generate an estimated position error er(n). A multiplication block 54 multiplies this estimated position er[n] by an estimated gain L to generate a correction value.

An addition block 56 adds this correction value and an estimated state Xb(n) in the current sample, such as an estimated position or estimated velocity. By this, an estimated state Xh(n), such as an estimated position or estimated velocity, in the current sample is generated by Expression (24).

In two degree of freedom control, an addition block 58 calculates the difference of the estimated state (position) Xh(n) and the target position locus r(n), and a multiplication block 76 multiplies the result by a coefficient matrix –F·Ad. A multiplication block 78 multiplies the output u(n–1), which is, by one sample, previous to the current sample, and which was delayed by a delay block 82, by a coefficient matrix –F·Bd. An addition block 80 adds this result and the result of the multiplication block 76, and acquires the output value u(n) of the second expression of the Expression (24).

The estimated state Xb(n+1) in the next sample (n+1) is calculated by multiplication blocks 62, 64-1 64-2 and an addition block 66 based on the estimated state Xh(n) and the output value u(n) in the current sample, and the output value u(n–1) of the previous sample, which was delayed by the delay block 34, using the third expression of Expression (24).

A delay block 68 delays the estimated state Xb(n+1) in the next sample (n+1), and a multiplication block 50 multiplies the output of the delay block 68 by C, and calculates the estimated position x(n) of the current sample.

Since the estimated state Td, which is advanced from the sample point by the amount of delay, is calculated considering the delay of the output of the two degree of freedom control (e.g. computation delay and hardware delay of the drive amplifier and the D/A converter), and the output is calculated from this estimated state, so the influence of the output delay can be prevented from the sample point even if state changes during calculation, position control at high precision becomes possible, and an overrun can be prevented.

The two degree of freedom control term is calculated at a same sample time, so the calculation sequence does not become complicated, and a high-speed calculation is possible. Furthermore, the state estimation sequence can be adhered to, and stability of the entire system can be maintained.

Fourth Embodiment of Position Control System

Figure 23:
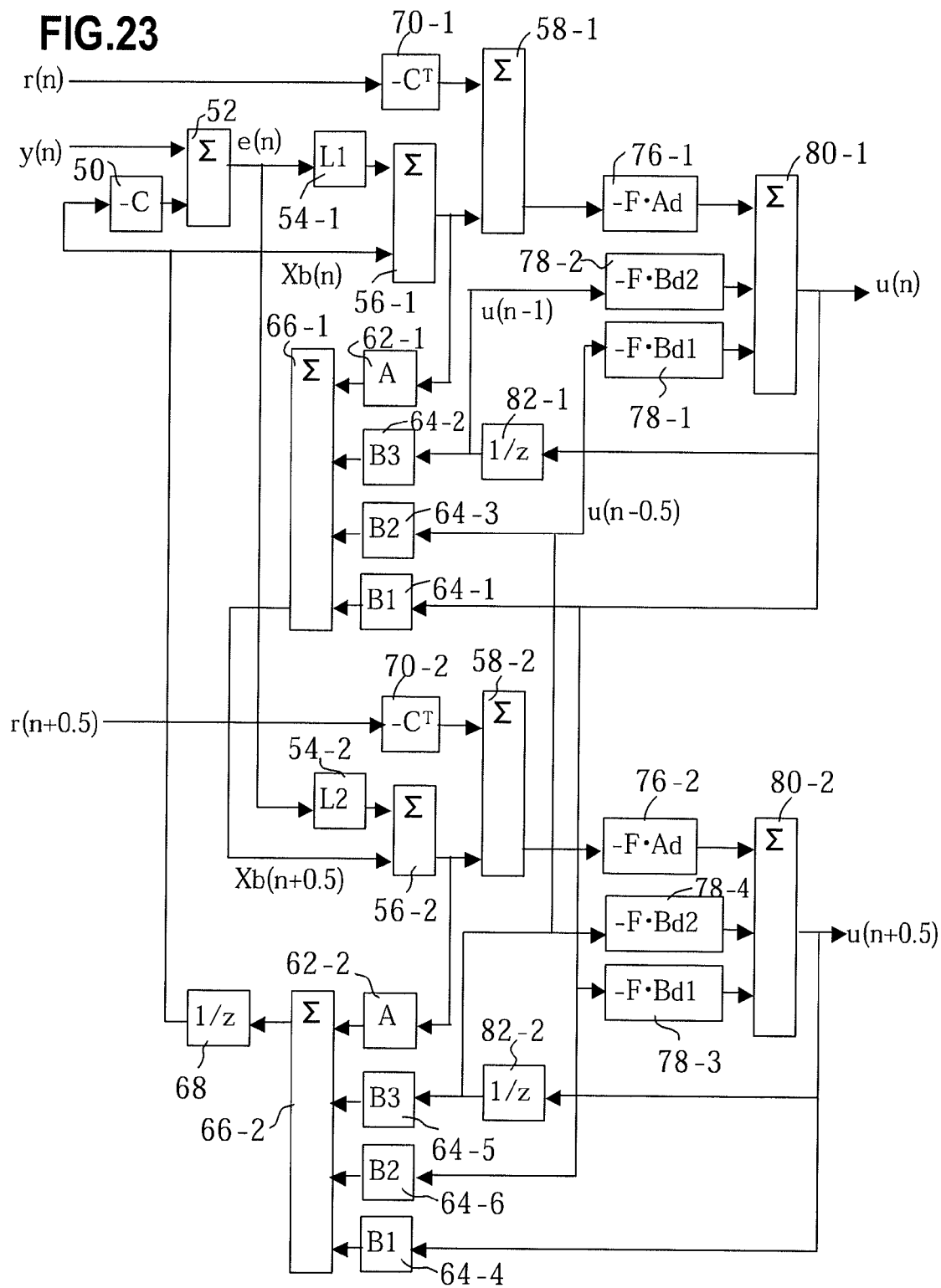
FIG. 23 is a block diagram depicting a current observer of a fourth embodiment of the position control system of the present invention.
Figure 24:
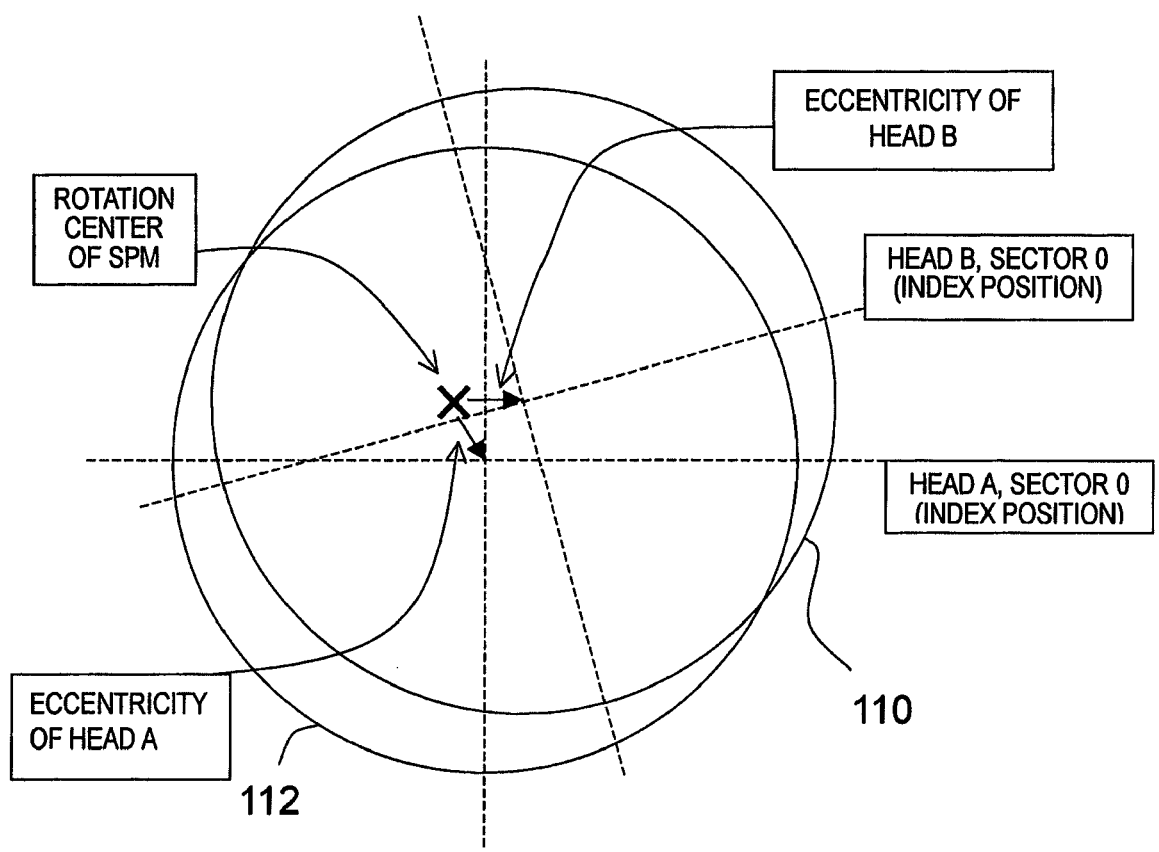
FIG. 24 is a diagram depicting eccentricity correction when heads are switched according to prior art.
Figure 25:
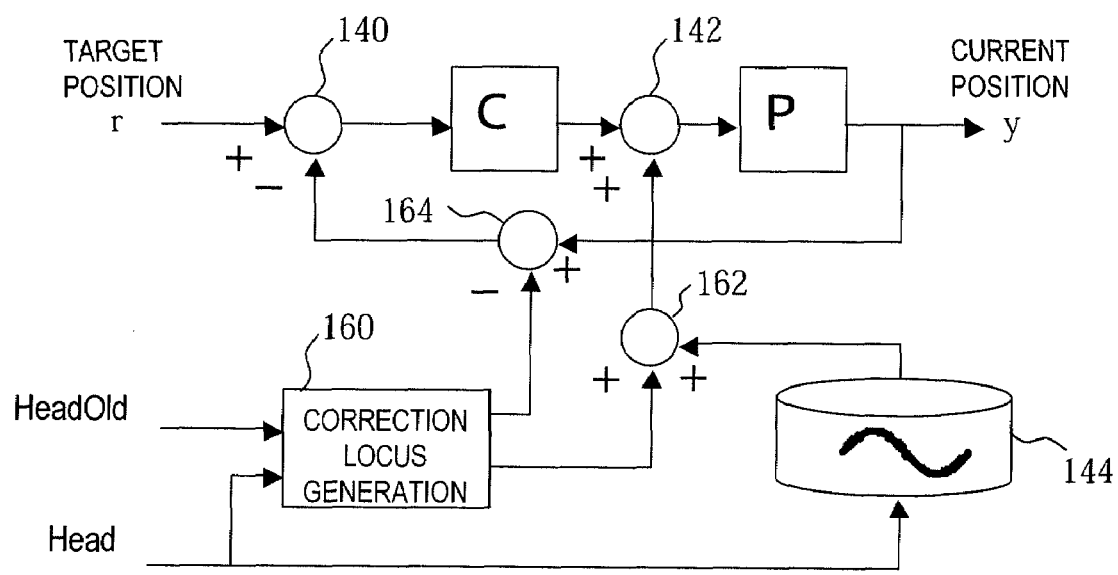
FIG. 25 is a block diagram depicting a position control device which performs eccentricity correction according to prior art.
Figure 26:
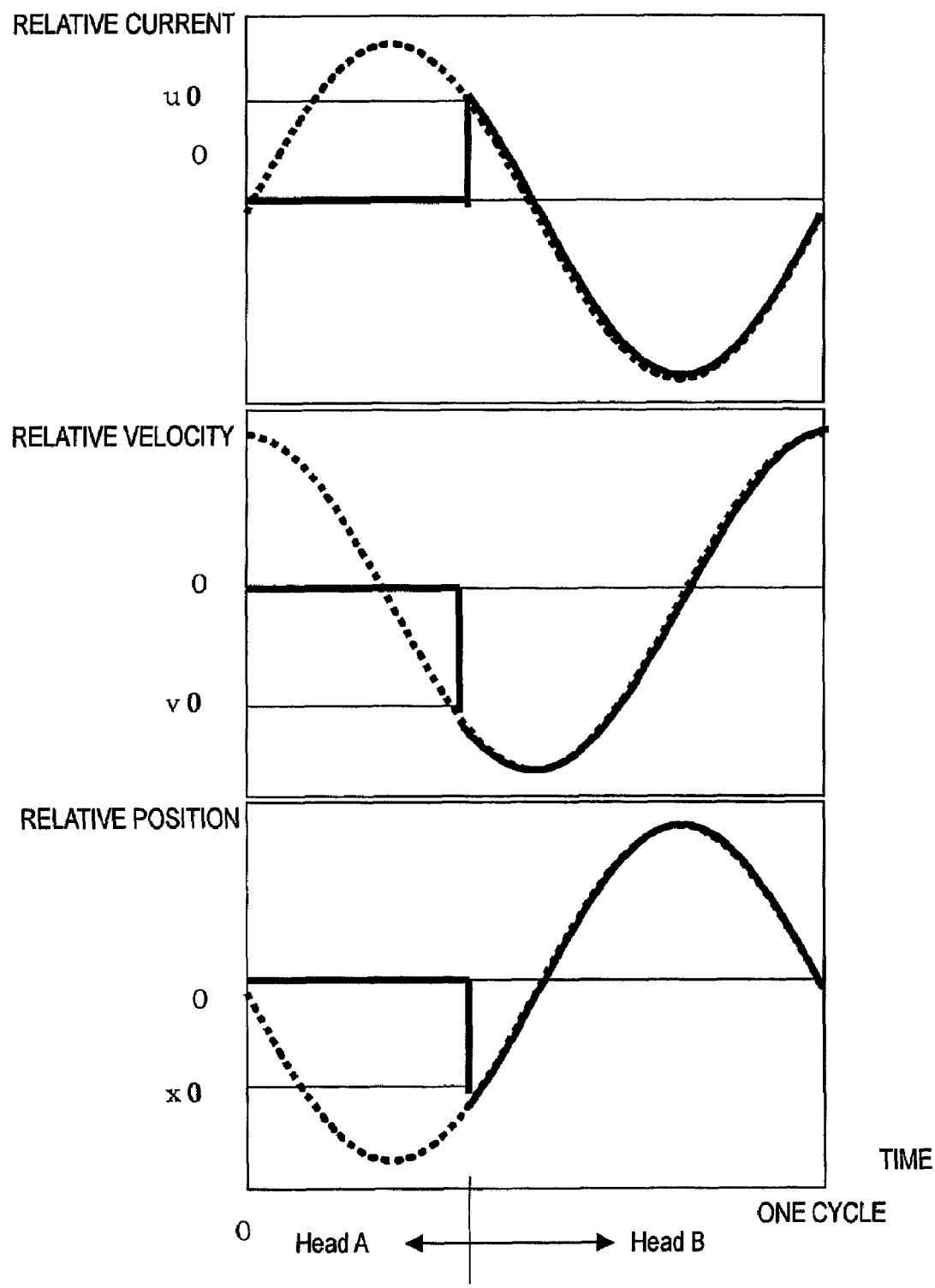
FIG. 26 is graphs of the current step difference at switching according to prior art.
Figure 27:
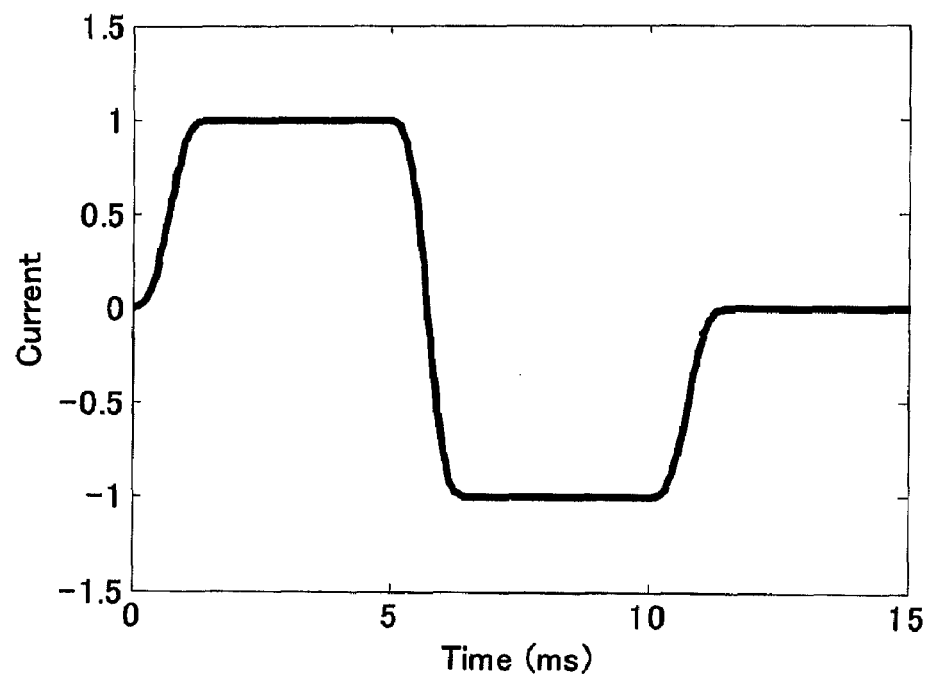
FIG. 27 is a graph of the seek current waveform.
Figure 28:
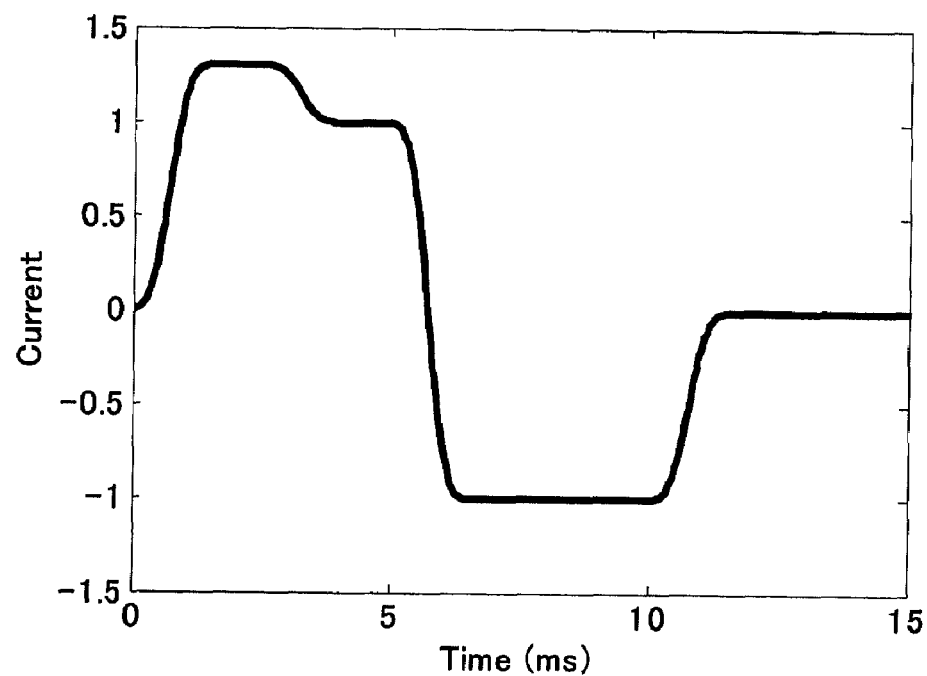
FIG. 28 is a first graph of the seek current waveform according to a switching control of prior art.
Figure 29:
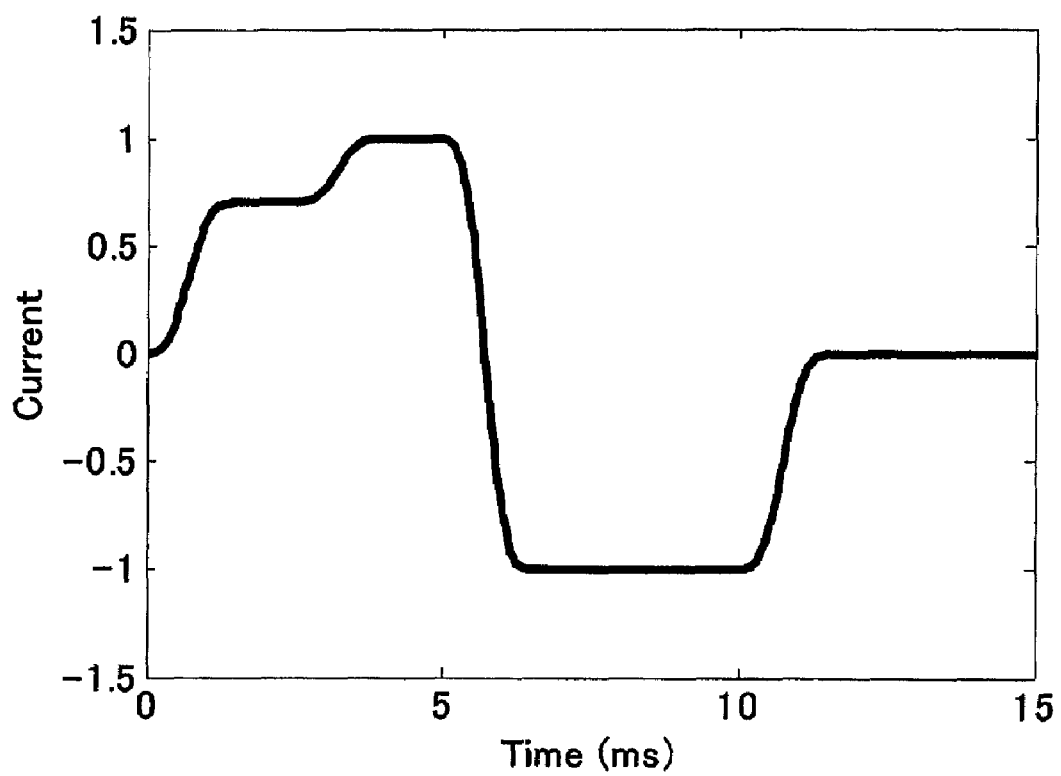
FIG. 29 is a second graph of the seek current waveform according to a switching control of prior art.

FIG. 23 is a block diagram depicting a fourth embodiment of the two degree of freedom position control system of the present invention. A multi-rate control is for changing the current two or three times in one sample. Changing twice is referred to as a "double multi-rate configuration", and changing three times is called a "triple multi-rate configuration".

The multi-rate control has a single rate state estimation which performs state estimation at a single rate, and multi-rate state estimation which performs state estimation at a multi-rate. In both cases, current is calculated twice, u(n) and u(n+0.5), and is changed in one sample.

The multi-rate control for single rate state estimation is described first. In the case of multi-rate control, the current output values u(n) and u(n+0.5) are output in one sample. Therefore Expression (23) is calculated twice. In other words, the following Expressions (25) and (26) are executed.

[Expression 25]

$$\left.\begin{aligned}
Xh(n) &= Xb(n) + L(y(n) - C \cdot Xb(n)) \\
Xh(n + Td/T) &= Ad \cdot (Xh(n) - C^T \cdot r(n)) + \\
&\quad Bd1 \cdot u(n - 0.5) + Bd2 \cdot u(n - 1) \\
u(n) &= -F \cdot Xh(n + Td/T) \\
Xb(n + 0.5) &= A \cdot Xh(n) + B1 \cdot u(n) + \\
&\quad B2 \cdot u(n - 0.5) + B3 \cdot u(n - 1)
\end{aligned}\right\} \quad (25)$$

[Expression 26]

$$\left.\begin{aligned}
Xh(n + 0.5) &= Xb(n + 0.5) \\
Xh(n + 0.5 + Td/T) &= Ad \cdot (Xh(n + 0.5) - C^T \cdot r(n + 0.5)) + \\
&\quad Bd1 \cdot u(n) + Bd2 \cdot u(n - 0.5) \\
u(n + 0.5) &= -F \cdot Xh(n + 0.5 + Td/T) \\
Xb(n + 1) &= A \cdot Xh(n) + B1 \cdot u(n + 0.5) + \\
&\quad B2 \cdot u(n) + B3 \cdot u(n - 0.5)
\end{aligned}\right\} \quad (26)$$

First Expression (25) is calculated to calculate the output u(n) and the next state Xb(n+0.5). This Expression (25) is basically the same as the Expression (23), but the current changes twice in one sample, so u(n–1) and u(n–0.5) are used to calculate Xh(n+Td/T) and Xb(n+0.5).

Then the estimated state Xh(n+0.5) at the (n+0.5) sample is regarded as the estimated state Xb(n+0.5) in Expression (26), and the output u(n+0.5) and the next state Xb(n+1) are computed using the target locus r(n+0.5), just like Expression (28).

Coefficients B1, B2 and B3 in the Expression (25) and the Expression (26) change depending on the comparison result of Td, in which delay is added, and T/2 (=n+0.5), and are determined by the following Expression (27) if Td<T/2.

[Expression 27]

In the case of $0 <= Td < T/2$ (27)

$$\begin{pmatrix} x(n+0.5) \\ v(n+0.5) \end{pmatrix} = \begin{pmatrix} 1 & 1/2 \\ 0 & 1 \end{pmatrix} \begin{pmatrix} x(n) \\ v(n) \end{pmatrix} +$$

$$\frac{Bl}{m} \frac{I_{MAX}}{Lp} \left\{ \begin{pmatrix} (T - 2Td)^2/8 \\ T(T - 2Td)/2 \end{pmatrix} u(n) + \begin{pmatrix} (T - Td)Td/2 \\ T \cdot Td \end{pmatrix} u(n - 0.5) \right\}$$

If T/2<Td<T, B1, B2, and B3 are determined by the following Expression (28).

[Expression 28]

In the case of $T/2 < Td < T$ (28)

$$\begin{pmatrix} x(n+0.5) \\ v(n+0.5) \end{pmatrix} = \begin{pmatrix} 1 & 1/2 \\ 0 & 1 \end{pmatrix} \begin{pmatrix} x(n) \\ v(n) \end{pmatrix} +$$

$$\frac{B1}{m} \frac{I_{MAX}}{Lp} \left\{ \begin{pmatrix} (T-2Td)^2/8 \\ T(T-2Td)/2 \end{pmatrix} u(n-0.5) + \begin{pmatrix} (T-Td)Td/2 \\ T \cdot Td \end{pmatrix} u(n-1) \right\}$$

In other words, the coefficient of u(n) of Expressions (27) and (28) is B1 in Expressions (25) and (26), the coefficient of u(n−0.5) is B2, and the coefficient of u(n−1) is B3. Therefore if Td<T/2, the coefficient B3 is "0", and if T/2<Td, B1 is "0".

Now the multi-rate control for multi-rate state estimation will be described. In multi-rate control, the current output values are output as u(n) and u(n+0.5) in one sample. Therefore in multi-rate state estimation as well, Expression (23) is calculated twice. In other words, the following Expressions (29) and (30) are executed.

[Expression 29]

$$\begin{aligned} e(n) &= y(n) - C \cdot Xb(n) \\ Xh(n) &= Xb(n) + L1 \cdot e(n) \\ Xh(n + Td/T) &= Ad \cdot (Xh(n) - C^T \cdot r(n)) + \\ & \quad Bd1 \cdot u(n-0.5) + Bd2 \cdot u(n-1) \\ u(n) &= -F \cdot Xh(n + Td/T) \\ Xb(n+0.5) &= A \cdot Xh(n) + B1 \cdot u(n) + \\ & \quad B2 \cdot u(n-0.5) + B3 \cdot (n-1) \end{aligned}$$ (29)

[Expression 30]

$$\begin{aligned} Xh(n+0.5) &= Xb(n+0.5) + L2 \cdot e(n) \\ Xh(n+0.5+Td/T) &= Ad \cdot (Xh(n+0.5) - C^T \cdot r(n+0.5)) + \\ & \quad Bd1 \cdot u(n) + Bd2 \cdot u(n-0.5) \\ u(n+0.5) &= -F \cdot Xh(n+0.5+Td/T) \\ Xb(n+1) &= A \cdot Xh(n) + B1 \cdot u(n+0.5) + \\ & \quad B2 \cdot u(n) + B3 \cdot u(n-0.5) \end{aligned}$$ (30)

First Expression (29) is calculated to calculate the output u(n) and the next state Xb(n+0.5). This Expression (29) is basically the same as Expression (23), but current changes twice in one sample, so u(n−1) and u(n−0.5) are used to calculate Xh(n+Td/T) and Xb(n+0.5). The estimated position error e(n) is separately calculated by (y(n)−C·Xb(n)).

Then, as shown in Expression (30), the estimated state Xh(n+0.5) in the (n+0.5) sample is corrected to the estimated state Xb(n+0.5) of Expression (29) by a value resulting when e(n) in Expression (29) is multiplied by L2. Then the output u(u+0.5) and the next state Xb(n+1) are calculated using the target locus r(n+0.5), just like Expression (30).

Here the coefficients B1, B2 and B3 in Expression (29) and Expression (30) change depending on the comparison result of Td, in which a delay is added, and T/2 (=n+0.5), and are determined by Expression (27) if Td<T/2 and by Expression (28) if 2/T<Td.

The difference from the single rate state estimation of Expressions (25) and (26) is that in Expression (30), the estimated state Xh(n+0.5) in the (n+0.5) sample is corrected to estimated state Xb(n+0.5) in Expression (29) by a value resulting when e(n) in Expression (29) is multiplied by L2.

In this way, multi-rate state estimation, which correcting the estimated state the second time, is corrected by a position error observed at the sample time, just like the first time.

If Xh(n+Td/T) and Xh(n+0.5+Td/T) in Expressions (29) and (30) are substituted for other expressions in Expression (29) and Expression (30), then Expression (29) and Expression (30) are transformed into the following Expression (31).

[Expression 31]

$$\begin{aligned} e(n) &= y(n) - C \cdot Xb(n) \\ Xh(n) &= Xb(n) + L1 \cdot e(n) \\ u(n) &= -F \cdot Ad \cdot (Xh(n) - C^T \cdot r(n)) - F \cdot Bd1 \cdot \\ & \quad u(n-0.5) - F \cdot Bd2 \cdot u(n-1) \\ Xb(n+0.5) &= A \cdot Xh(n) + B1 \cdot u(n) + \\ & \quad B2 \cdot u(n-0.5) + B3 \cdot u(n-1) \\ Xh(n+0.5) &= Xb(n+0.5) + L2 \cdot e(n) \\ u(n+0.5) &= -F \cdot Ad \cdot (Xh(n+0.5) - C^T \cdot r(n+0.5)) - \\ & \quad F \cdot Bd1 \cdot u(n) - F \cdot Bd2 \cdot u(n-0.5) \\ Xb(n+1) &= A \cdot Xh(n) + B1 \cdot u(n+0.5) + \\ & \quad B2 \cdot u(n) + B3 \cdot u(n-0.5) \end{aligned}$$ (31)

Expression (31) is the result when Xh(n+Td/T) of Expression (29) is included in the calculation of u(n) of Expression (29), and Xh(n+0.5+Td/T) of Expression (30) is included in u(u+0.5) of Expression (30), and the results are combined. As the number of expressions decrease, calculation time decreases, and response time becomes faster.

If L2 of Expression (31) is "0", the Expression (31) indicates the single rate state estimation expressions described in Expression (25) and Expression (26), and if L2 is not "0", the Expression (31) indicates multi-rate state estimation expressions.

FIG. 23 is a block diagram depicting Expression (31). The configuration of FIG. 23 is basically two configurations of FIG. 22 linked in a series. As FIG. 23 shows, the observation position in the current sample n (position error) y(n) is received, and the difference of the estimated position of the current sample C·Xb(n), which was estimated in the previous sample, and the observation position y(n) is calculated by a computation block 52-1, so as to generate an estimated position error er(n). A multiplication block 54-1 multiplies this estimated position error er(n) by an estimated gain L1 to generate a correction value.

An addition block 56-1 adds the correction value, and an estimated status Xb(n) in the current sample, such as an estimated position or estimated velocity. By this, an estimated state Xh(n), such as an estimated position or estimated velocity, in the current sample is generated by Expression (31).

In two degree of freedom control, an addition block 58-1 calculates the difference of the estimated state (position) Xh(n) and the target position locus r(n), and a multiplication block 76-1 multiplies the result by coefficient matrix −F·Ad. A multiplication block 78-2 multiplies the output u(n−1) by coefficient matrix −F·Bd2, and multiplication block 78-1 multiplies the output u(n−0.5) by coefficient matrix −F·Bd1.

An addition block 80-1 adds the outputs of the three multiplication blocks 76-1, 78-1 and 78-2, and acquires the output value u(n) of the third expression of Expression (31).

An addition block 66-1 calculates the estimated state Xb(n+0.5) in the next sample (n+0.5) as the fourth expression of Expression (31) by adding a value resulting when the estimated state Xh(n) of the current sample is multiplied by a coefficient matrix A in a multiplication block 62-1, a value resulting when the output value u(n) is multiplied by a coefficient matrix B1 in a multiplication block 64-1, a value resulting when the output value u(n−0.5) is multiplied by a coefficient matrix B2 in a multiplication block 64-3, and a value resulting when the output value u(n−1) of the previous sample, delayed by a delay block 82-1, is multiplied by a coefficient matrix B3 in a multiplication block 64-2.

Then a multiplication block 54-2 generates a correction value by multiplying the estimated position error er(n), calculated in the computing block 52, by an estimated gain L2. An addition block 56-2 adds this correction value and the estimated state Xb(n+0.5), such as an estimated position or estimated velocity, in the current sample. By this, the estimated state Xh(n+0.5), such as an estimated position or estimated velocity in the current sample in Expression (31), is generated.

In the case of multi-rate control, an addition block 58-2 calculates the difference value of the estimated state (position) Xh(n+0.5) and the target position locus r(n+0.5), and a multiplication block 76-2 calculates a value resulting when the result is multiplied by a coefficient matrix −F·Ad.

A multiplication block 78-4 multiplies the output u(n−0.5) by a coefficient matrix −F·Bd2, and a multiplication block 78-3 multiplies the output u(n) by a coefficient matrix −F·Bd1. An addition block 80-2 adds the outputs of the three multiplication blocks 76-2, 78-3 and 78-4, and acquires the output value u(n+0.5) of the sixth expression of Expression (31).

On the other hand, the estimated state Xb(n+1) in the next sample (n+1) is calculated as the seventh expression of Expression (31) by adding, according to a multiplication block 66-2, a value resulting when the estimated state Xh(n+0.5) of the current sample is multiplied by the coefficient matrix A in a multiplication block 62-2, a value resulting when the output value u(n+0.5) is multiplied by the coefficient matrix B1 in a multiplication block 64-4, a value resulting when the output value u(n) is multiplied by the coefficient matrix B2 in a multiplication block 64-6, and a value resulting when the output value u(n−0.5) of the previous sample, delayed by a delay block 82-2, is multiplied by the coefficient matrix B3 in a multiplication block 64-5.

A delay block 68 delays the estimated state Xb(n+1) in the next sample (n+1), and a multiplication block 20-1 multiplies the output of the delay block 50 by C to calculate the estimated position x(n) of the current sample.

In this way, in multi-rate control, the two degree of freedom control term is calculated at a same sample time, so the calculation sequence does not become complicated, and high-speed calculation is possible. Furthermore, the state estimation sequence can be adhered to, and stability of the entire system can be maintained.

In the block in FIG. 23, if L2 is set to "0" in the multiplication block 54-2, the configuration becomes that of a single rate state estimation, so the configuration in FIG. 23 can be used for both single rate and multi-rate state estimation.

In this case, the target locus generation section 20 described in FIG. 5, FIG. 7 and FIG. 12 generates target locus r at each 0.5 sample time. In other words, r(n) and r(n+0.5) are generated. In the same way, the current step difference cancellation locus generation section 42 in FIG. 12 also generates the current step difference cancellation locus r' at each 0.5 sample time. In other words, r'(n) and r'(n+0.5) are generated.

Other Embodiments

In the above embodiments, the head position control was described using an example of applying the head positioning device of the magnetic disk device, but the present invention can be applied to other disk devices, such as an optical disk device.

The present invention was described using embodiments, but the present invention can be modified in various ways within the scope of the spirit thereof, and these variant forms shall not be excluded from the scope of the present invention.

Since the initial value of the correction locus for canceling the current step difference of output current is calculated based on an output current supplied to the actuator before switching and an eccentricity correction current and initial velocity of another head after switching, and the correction locus according to the initial value is supplied to the two degree of freedom control system where a seek locus is input, the current step difference can be corrected by the initial value of a locus that cancels the current step difference according to the characteristics of the two degree of freedom control system, and one parameter can correct the initial velocity and the current step difference. Hence the design of a correction waveform of the current step difference, with respect to each seek current waveform, becomes easier, and seek control without generating vibration and noise can be easily implemented.

What is claimed is:

1. A medium storage device, comprising:
   a plurality of heads for at least reading data on each surface of rotating storage media;
   an actuator for positioning the plurality of heads at a predetermined position of the storage media; and
   a control unit configured as a two degree of freedom control system which corrects an eccentricity of the actuator by eccentricity correction current on a disk surface facing a specified head, and executes seek control according to a position error between a target position of the head and a current position acquired from the head,
   wherein when the control unit switches one head to another head and seeks the another head, the control unit calculates an initial value of a correction locus to cancel a current step difference of the output current due to the head switching from an output current supplied to the actuator before the switching and the eccentricity correction current and initial velocity of the another head after the switching, and supplies a correction locus according to the initial value to the two degree of freedom control system where seek locus is input.

2. The medium storage device according to claim 1, wherein the control unit adds the initial value to the seek distance to be sought, generates a seek locus of the added distance, and supplies the added seek locus to the two degree of freedom current observer control.

3. The medium storage device according to claim 1, wherein the control unit generates a corrected position locus to be "0" from the initial value according to the time elapsed, and supplies the corrected position locus to the two degree of freedom current observer control.

4. The medium storage device according to claim 3, wherein the control unit adds the seek locus and the corrected position locus, and supplies the added locus to the two degree of freedom current observer control system.

5. The medium storage device according to claim 1, wherein the control unit converts the initial value to an initial current value, generates a corrected current locus to be "0" from the initial current value according to the time elapsed, and supplies the corrected current locus to the two degree of freedom current observer control.

6. The medium storage device according to claim 5, wherein the control unit adds the corrected current locus to current output of the two degree of freedom current observer control system where the seek locus is supplied.

7. The medium storage device according to claim 1, wherein the control unit acquires a current position of a sample after switching and a current position of a next sample from output of the head, and calculates the current velocity.

8. The medium storage device according to claim 1, wherein the control unit calculates the current velocity from a difference between the output current of the sample before switching and the eccentricity correction current after switching.

9. The medium storage device according to claim 1, wherein the control unit corrects an estimated position of the current sample based on an estimated position error between the current position and the estimated position of the current sample of the current observer, computes a difference between the corrected estimated position and a target locus of the current sample, computes an output value of the actuator from the difference, and computes an estimated position for next output value computation based on the corrected estimated position and the output value of the current sample.

10. The medium storage device according to claim 9, wherein the control unit computes an estimated position at a time advanced from the sampling point of time by a predetermined time based on an output value that is, by one sample, previous to the current sample and the difference, computes an output value to the actuator based on the advanced estimated position, and computes an estimated position for next output value computation based on the corrected estimated position, output value of the current sample, and output value that is, by one sample, previous the current sample.

11. A head position control device for controlling positioning of an actuator which positions a plurality of heads for at least reading data on each surface of rotating storage media at a predetermined position of the storage media, comprising:
an eccentricity correction current table which stores eccentricity correction current on a disk surface facing a specified head; and
a control unit configured as a two degree of freedom control system which corrects an eccentricity of the actuator by eccentricity correction current of a specified head in the eccentricity correction current table, and executes seek control according to a position error between a target position of the head and a current position acquired from the head,
wherein when the control unit switches one head to another head and seeks the another head, the control unit calculates an initial value of a correction locus to cancel a current step difference of the output current due to the head switching from an output current supplied to the actuator before the switching and the eccentricity correction current and initial velocity of the other head after the switching, and supplies a correction locus according to the initial value to the two degree of freedom control system where seek locus is input.

12. The head position control device according to claim 11, wherein the control unit adds the initial value to the seek distance to be sought, generates a seek locus of the added distance, and supplies the added seek locus to the two degree of freedom current observer control.

13. The head position control device according to claim 11, wherein the control unit generates a corrected position locus to be "0" from the initial value according to the time elapsed, and supplies the corrected position locus to the two degree of freedom current observer control.

14. The head position control device according to claim 13, wherein the control unit adds the seek locus and the corrected position locus, and supplies the added locus to the second degree of freedom current observer control system.

15. The head position control device according to claim 11, wherein the control unit converts the initial value into an initial current value, generates a corrected current locus to be "0" from the initial current value according to the time elapsed, and supplies the corrected current locus to the two degree of freedom current observer control.

16. The head position control device according to claim 15, wherein the control unit adds the corrected current locus to current output of the two degree of freedom current observer control system where the seek locus is supplied.

17. The head position control device according to claim 11, wherein the control unit acquires a current position of a sample after switching and a current position of a next sample from the output of the head, and calculates the current velocity.

18. The head position control device according to claim 11, wherein the control unit calculates the current velocity from a difference between the output current of the sample before switching and the eccentricity correction current after switching.

19. The head position control device according to claim 11, wherein the control unit corrects an estimated position of the current sample based on an estimated position error between the current position and the estimated position of the current sample of the current observer, computes a difference between the corrected estimated position and a target locus of the current sample, computes an output value of the actuator from the difference, and computes an estimated position for next output value computation based on the corrected estimated position and the output value of the current sample.

20. The head position control device according to claim 19, wherein the control unit computes an estimated position at a time advanced from the sampling point of time by a predetermined time based on an output value that is, by one sample, previous to the current sample and the difference, computes an output value to the actuator based on the advanced estimated position, and computes an estimated position for next output computation based on the corrected estimated position, output value of the current sample, and output value that is, by one sample, previous to the current sample.

* * * * *